(12) United States Patent
Ghannam et al.

(10) Patent No.: US 12,578,462 B2
(45) Date of Patent: Mar. 17, 2026

(54) SYSTEMS AND METHODS FOR DETECTING SPATIAL AVAILABILITY AROUND A VEHICLE

(71) Applicant: Ford Global Technologies, LLC, Dearborn, MI (US)

(72) Inventors: Mahmoud Yousef Ghannam, Canton, MI (US); John Robert Van Wiemeersch, Novi, MI (US); Vivekanandh Elangovan, Canton, MI (US); Nicholas Colella, Grosse Ile, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 393 days.

(21) Appl. No.: 18/201,506

(22) Filed: May 24, 2023

(65) Prior Publication Data

US 2024/0393455 A1    Nov. 28, 2024

(51) Int. Cl.
*G01S 13/931* (2020.01)

(52) U.S. Cl.
CPC ..... *G01S 13/931* (2013.01); *G01S 2013/9314* (2013.01); *G01S 2013/9317* (2013.01); *G01S 2013/9318* (2020.01); *G01S 2013/93185* (2020.01); *G01S 2013/93272* (2020.01)

(58) Field of Classification Search
CPC ........... G01S 2013/9314; G01S 13/931; G01S 13/937; G01S 13/933; G01S 15/931; G01S 15/932; G01S 17/931
USPC .......................................................... 342/70
See application file for complete search history.

(56) References Cited

U.S. PATENT DOCUMENTS

| | | | | | |
|---|---|---|---|---|---|
| 5,585,798 | A | * | 12/1996 | Yoshioka | ................ B60T 8/172 342/107 |
| 5,732,785 | A | * | 3/1998 | Ran | ........................ B60R 19/205 180/274 |
| 6,198,426 | B1 | * | 3/2001 | Tamatsu | ................ G01S 13/931 342/72 |

(Continued)

FOREIGN PATENT DOCUMENTS

| | | |
|---|---|---|
| DE | 102014101206 A1 | 8/2015 |
| DE | 102018218269 A1 | 4/2020 |

(Continued)

*Primary Examiner* — Michael W Justice
(74) *Attorney, Agent, or Firm* — Frank Lollo; Price Heneveld LLP

(57) ABSTRACT

A vehicle includes a passenger compartment having a side and an upper wall extending from the side in an upper plan. The vehicle further includes an extension extending from the side of the passenger compartment to an end that extends in an end plane. The vehicle further includes at least one time-of-flight sensor configured to capture positional information about an obstruction outside the vehicle. The vehicle further includes control circuitry in communication with the at least one time-of-flight sensor. The control circuitry is configured to define a space above the extension between the side, the upper plane, and the end plane. The control circuitry is further configured to calculate, based on the positional information, an available position for the vehicle having the obstruction in the space. The control circuitry is further configured to generate an output in response to the available position.

20 Claims, 14 Drawing Sheets

(56) References Cited

U.S. PATENT DOCUMENTS

| | | | | |
|---|---|---|---|---|
| 6,269,307 | B1* | 7/2001 | Shinmura | G01S 13/931 |
| | | | | 340/436 |
| 6,583,752 | B2* | 6/2003 | Samukawa | G01S 17/42 |
| | | | | 342/28 |
| 6,642,839 | B1* | 11/2003 | Gunderson | G01S 13/931 |
| | | | | 340/904 |
| 6,775,605 | B2* | 8/2004 | Rao | B60R 21/013 |
| | | | | 702/143 |
| 7,061,372 | B2* | 6/2006 | Gunderson | G01S 13/862 |
| | | | | 340/904 |
| 7,230,524 | B2* | 6/2007 | Watanabe | G01S 13/931 |
| | | | | 348/148 |
| 7,877,209 | B2* | 1/2011 | Harris | G08G 1/165 |
| | | | | 701/301 |
| 7,991,552 | B2* | 8/2011 | Samuel | B60R 21/0136 |
| | | | | 340/901 |
| 8,380,426 | B2* | 2/2013 | Konijnendijk | G01S 15/66 |
| | | | | 701/301 |
| 8,938,337 | B2* | 1/2015 | Nakakura | G01S 17/42 |
| | | | | 701/1 |
| 9,164,955 | B2* | 10/2015 | Lavoie | B62D 15/0285 |
| 9,269,263 | B2* | 2/2016 | Gieseke | G08G 1/04 |
| 9,505,403 | B2* | 11/2016 | Stefan | B60W 30/06 |
| 9,573,624 | B2* | 2/2017 | Mori | G01S 15/931 |
| 9,606,225 | B2 | 3/2017 | Okita et al. | |
| 9,626,867 | B2* | 4/2017 | Trombley | G08G 1/161 |
| 10,160,447 | B2 | 12/2018 | Lavoie et al. | |
| 10,501,052 | B2 | 12/2019 | Schindler et al. | |
| 10,607,490 | B2* | 3/2020 | Ikedo | B60Q 9/008 |
| 10,663,581 | B2* | 5/2020 | Decker | G01S 13/867 |
| 10,740,796 | B2 | 8/2020 | Brubaker | |
| 10,796,580 | B2* | 10/2020 | Dellock | G01S 17/931 |
| 10,814,840 | B2* | 10/2020 | Kim | B60W 30/09 |
| 10,821,946 | B2* | 11/2020 | Kim | B60T 8/172 |
| 10,824,882 | B1* | 11/2020 | Ignaczak | B60W 40/09 |
| 10,909,850 | B2* | 2/2021 | Takaki | B60W 30/09 |
| 10,913,393 | B2* | 2/2021 | Tsang | B60Q 9/00 |
| 11,124,113 | B2* | 9/2021 | Singh | G06T 7/70 |
| 11,127,301 | B1 | 9/2021 | Lai et al. | |
| 11,267,321 | B2* | 3/2022 | Jocz | B60J 7/068 |
| 11,313,167 | B2* | 4/2022 | Akbarian | B60R 16/03 |
| 11,454,713 | B2* | 9/2022 | Friend | E02F 9/262 |
| 11,493,922 | B1 | 11/2022 | Avram et al. | |
| 11,511,733 | B2* | 11/2022 | Niewiadomski | B60W 30/06 |
| 11,631,255 | B2* | 4/2023 | Yoo | G01S 13/931 |
| | | | | 701/49 |
| 11,691,651 | B2* | 7/2023 | Yasutomi | G06T 7/50 |
| | | | | 701/28 |
| 11,851,061 | B2* | 12/2023 | Niewiadomski | |
| | | | | B60W 30/18009 |
| 11,955,020 | B2* | 4/2024 | Ahmad | G08G 5/26 |
| 2002/0003489 | A1* | 1/2002 | Samukawa | G08G 1/167 |
| | | | | 342/72 |
| 2003/0100982 | A1* | 5/2003 | Rao | B60R 21/013 |
| | | | | 180/274 |

| | | | | |
|---|---|---|---|---|
| 2004/0155759 | A1* | 8/2004 | Gunderson | G01S 13/862 |
| | | | | 340/435 |
| 2005/0225439 | A1* | 10/2005 | Watanabe | B62D 15/027 |
| | | | | 342/70 |
| 2009/0000196 | A1* | 1/2009 | Kollar | E05F 15/43 |
| | | | | 49/28 |
| 2010/0076651 | A1* | 3/2010 | Nakakura | E05C 17/00 |
| | | | | 701/49 |
| 2011/0077864 | A1* | 3/2011 | Konijnendijk | G01S 15/931 |
| | | | | 701/301 |
| 2013/0113614 | A1* | 5/2013 | Yopp | B60Q 9/00 |
| | | | | 340/438 |
| 2013/0226390 | A1 | 8/2013 | Luo et al. | |
| 2013/0234844 | A1* | 9/2013 | Yopp | B60Q 9/008 |
| | | | | 340/435 |
| 2013/0297173 | A1* | 11/2013 | Takagi | B60W 30/06 |
| | | | | 701/70 |
| 2015/0175162 | A1* | 6/2015 | Nakadori | B60W 30/16 |
| | | | | 701/96 |
| 2015/0329110 | A1* | 11/2015 | Stefan | B60Q 9/002 |
| | | | | 701/1 |
| 2016/0280263 | A1* | 9/2016 | Mori | B62D 15/027 |
| 2018/0144637 | A1* | 5/2018 | Ikedo | G08G 1/166 |
| 2018/0236985 | A1* | 8/2018 | Kim | B60Q 1/44 |
| 2018/0236986 | A1* | 8/2018 | Kim | B60T 8/172 |
| 2018/0297519 | A1* | 10/2018 | Singh | H04N 7/181 |
| 2019/0018132 | A1* | 1/2019 | Decker | G01S 13/04 |
| 2019/0066509 | A1* | 2/2019 | Dellock | B60Q 1/543 |
| 2019/0103025 | A1* | 4/2019 | Takaki | G08G 1/166 |
| 2019/0128047 | A1* | 5/2019 | Kang | G05D 1/0231 |
| 2019/0225215 | A1* | 7/2019 | Tohge | G01S 13/42 |
| 2020/0018111 | A1* | 1/2020 | Akbarian | E05F 15/40 |
| 2020/0132837 | A1* | 4/2020 | Kamiya | G01S 15/46 |
| 2020/0264607 | A1 | 8/2020 | Smith et al. | |
| 2021/0001932 | A1 | 1/2021 | Grossman | |
| 2021/0002852 | A1* | 1/2021 | Nishi | E02F 9/2041 |
| 2021/0031737 | A1* | 2/2021 | Kim | B60T 7/22 |
| 2021/0061280 | A1* | 3/2021 | Niewiadomski | G06T 7/50 |
| 2021/0094568 | A1 | 4/2021 | Nakanishi et al. | |
| 2021/0146915 | A1* | 5/2021 | Niewiadomski | G06T 7/13 |
| 2021/0239808 | A1* | 8/2021 | Friend | E02F 9/2041 |
| 2021/0264172 | A1* | 8/2021 | Yoo | G08B 21/18 |
| 2021/0269062 | A1* | 9/2021 | Yasutomi | G06T 7/50 |
| 2021/0323548 | A1* | 10/2021 | Fukatsu | G01S 13/931 |
| 2021/0382174 | A1 | 12/2021 | Chen et al. | |
| 2021/0394596 | A1* | 12/2021 | Jocz | B60J 7/0573 |
| 2022/0063720 | A1 | 3/2022 | Oh et al. | |
| 2022/0126748 | A1* | 4/2022 | Diamond | B60Q 9/002 |
| 2022/0314719 | A1 | 10/2022 | Ma et al. | |
| 2022/0366792 | A1 | 11/2022 | Gaßet al. | |
| 2022/0398932 | A1* | 12/2022 | Ahmad | H04W 4/90 |
| 2023/0128234 | A1* | 4/2023 | Okabe | G01S 13/08 |
| | | | | 701/301 |
| 2025/0026259 | A1* | 1/2025 | Nishikawa | B60Q 1/1423 |

FOREIGN PATENT DOCUMENTS

| | | |
|---|---|---|
| EP | 3081731 B1 | 9/2019 |
| WO | WO1999042856 A2 | 8/1999 |

* cited by examiner

SYSTEMS AND METHODS FOR DETECTING SPATIAL AVAILABILITY AROUND A VEHICLE

FIELD OF THE DISCLOSURE

The present disclosure generally relates to systems and methods for detecting spatial availability around a vehicle and, more particularly, to space optimization for positioning a vehicle using time-of-flight sensors of the vehicle.

BACKGROUND OF THE DISCLOSURE

Conventional exterior detection systems for vehicles may incorporate time-of-flight technology.

SUMMARY OF THE DISCLOSURE

According to a first aspect of the present disclosure, a vehicle includes a passenger compartment having a side and an upper wall extending from the side in an upper plan. The vehicle further includes an extension extending from the side of the passenger compartment to an end that extends in an end plane. The vehicle further includes at least one time-of-flight sensor configured to capture positional information about an obstruction outside the vehicle. The vehicle further includes control circuitry in communication with the at least one time-of-flight sensor. The control circuitry is configured to define a space above the extension between the side, the upper plane, and the end plane. The control circuitry is further configured to calculate, based on the positional information, an available position for the vehicle having the obstruction in the space. The control circuitry is further configured to generate an output in response to the available position.

Embodiments of the first aspect of the present disclosure can include any one or a combination of the following features:

a powertrain that moves the vehicle in a motion direction, and the control circuitry is further configured to communicate an instruction to adjust the powertrain in response to the calculation of the available position;

the control circuitry is further configured to determine a first potential contact point between the obstruction and the end, determine a second potential contact point between the obstruction and the side, and compare the first and second potential contact points to calculate the available position, and the instruction to adjust the powertrain is based on the comparison;

the control circuitry is further configured to calculate a first contact distance between the first potential contact point and the end, calculate a second contact distance between the second potential contact point and the side, and assign a maximum travel for the vehicle in the motion direction to one of the first contact distance and the second contact distance;

the control circuitry is further configured to assign the maximum travel based on the shorter of the first contact distance and the second contact distance;

the powertrain includes a brake system that adjusts a speed of the vehicle in response to the maximum travel;

the extension includes an outer compartment of the vehicle;

the space is defined above a trunk or a hood of the vehicle;

the outer compartment is a bed of a truck;

a cover selectively disposed in the space for covering the bed of the truck;

the control circuitry is further configured to determine a presence of the cover;

an input in communication with the control circuitry and configured to detect the cover; and a steering system that adjusts a steering angle of the vehicle to align the vehicle with the available position.

According to a second aspect of the present disclosure, a vehicle includes a passenger compartment having a side and an upper wall extending from the side in an upper plane. The vehicle further includes an extension extending from the side of the passenger compartment to an end that extends in an end plane. The vehicle further includes at least one time-of-flight sensor configured to capture positional information about an obstruction outside the vehicle. The vehicle further includes a powertrain that moves the vehicle in a motion direction. The vehicle further includes control circuitry in communication with the at least one time-of-flight sensor and the powertrain. The control circuitry is configured to define a space above the extension between the side, the upper plane, and the end plane. The control circuitry is further configured to calculate, based on the positional information, an available position for the vehicle having the obstruction in the space. The control circuitry is further configured to communicate an instruction.

Embodiments of the second aspect of the present disclosure can include any one or a combination of the following features:

the control circuitry is further configured to determine a first potential contact point between the obstruction and the end, determine a second potential contact point between the obstruction and the side, and compare the first and second potential contact points to calculate the available position, and the instruction to adjust the powertrain is based on the comparison;

the control circuitry is further configured to calculate a first contact distance between the first potential contact point and the end, calculate a second contact distance between the second potential contact point and the side, and assign a maximum travel for the vehicle in the motion direction to one of the first contact distance and the second contact distance;

the control circuitry is further configured to assign the maximum travel based on the shorter of the first contact distance and the second contact distance;

the powertrain includes a brake system that adjusts a speed of the vehicle in response to the maximum travel; and the extension includes outer compartment of the vehicle.

According to a third aspect of the present disclosure, a vehicle includes a passenger compartment having a side and an upper wall extending from the side in an upper plane. The vehicle further includes an outer compartment extending from the side of the passenger compartment to an end that extends in an end plane. The vehicle further includes at least one time-of-flight sensor configured to capture positional information about an obstruction outside the vehicle. The vehicle further includes a powertrain that moves the vehicle in a motion direction. The vehicle further includes control circuitry in communication with the at least one time-of-flight sensor and the powertrain. The control circuitry is configured to define a space above the extension between the side, the upper plane, and the end plane. The control circuitry is further configured to calculate, based on the positional information, an available position for the vehicle having the obstruction in the space. The control circuitry is further configured to determine a first potential contact point between the obstruction and the end. The control circuitry is further configured to determine a second potential contact point between the obstruction and the side. The control circuitry is further configured to compare the first and second potential contact points to calculate the available position. The control circuitry is further configured to communicate an instruction to adjust the powertrain in based on the comparison.

These and other features, advantages, and objects of the present disclosure will be further understood and appreciated by those skilled in the art by reference to the following specification, claims, and appended drawings.

DETAILED DESCRIPTION OF PREFERRED EMBODIMENTS

Figure 1:
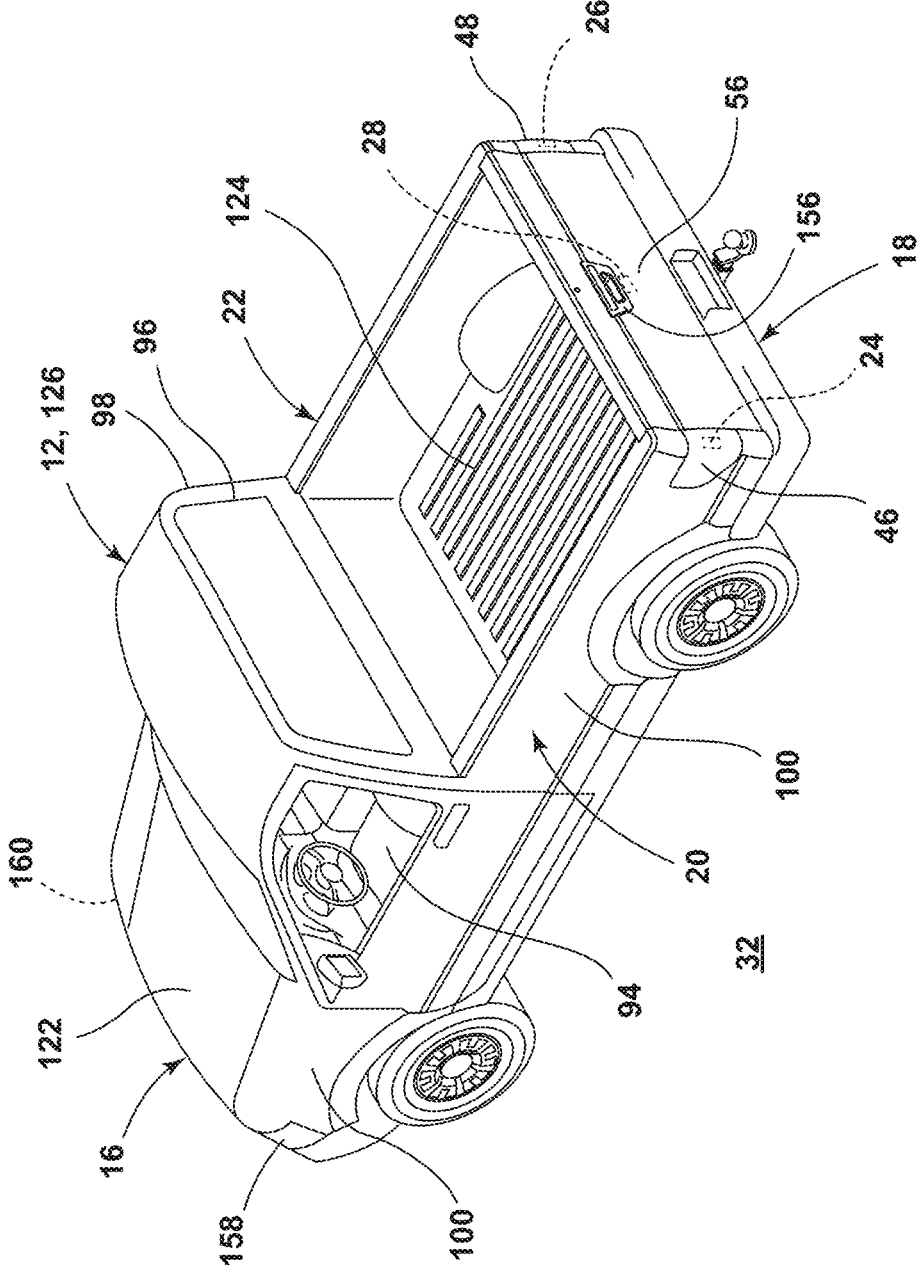
FIG. 1 is a top-perspective view of a truck incorporating a detection system according to one aspect of the present disclosure.

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements may or may not be to scale and certain components may or may not be enlarged relative to the other components for purposes of emphasis and understanding.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a detection system for a vehicle. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring generally to FIGS. 1-16C, a detection system 10 is provided in connection with a vehicle 12 and is configured to detect objects, structures, terrain, or the like outside of and proximate to the vehicle 12. The detection system 10 includes time-of-flight devices 14 that are arranged around the vehicle 12 to allow various detection techniques using a common set of sensors. For example, the time-of-flight devices 14 may be sensors that are configured to emit pulses of electro-magnetic waves at different frequencies depending on the operating mode. Accordingly, a dynamic, or multimode, system may be provided to allow enhanced detection techniques depending on a desired operation for the vehicle 12.

Reference to FIGS. 1-5, according to a first example, the vehicle 12 includes a plurality of sides 16, 18, 20, 22 each having right and left portions. The plurality of sides 16, 18, 20, 22 includes a front 16, a rear 18, a driver side 20, and the passenger side 22. It is contemplated that the driver side 20 and passenger side 22 may be referred to left and right sides of the vehicle 12, and that the vehicle 12 may be autonomous and/or may lack a driver or a passenger without deviating from the examples of the present disclosure. The time-of-flight devices 14 may include a plurality of radio detection and ranging (RADAR) modules 24, 26, 28 arranged at a common one of the sides 16, 18, 20, 22, such as the rear 18 of the vehicle 12, and configured to detect an obstruction 30 in a region exterior 32 to the vehicle 12. The plurality of RADAR modules 24, 26, 28 includes a first RADAR module 24 on the driver side 20 of the vehicle 12. The first RADAR module 24 has a first field of view 34. A second RADAR module 26 is on the passenger side 22 of the vehicle 12 and has a second field of view 36. A third RADAR module 28 is spaced from the first RADAR module 24 at a first distance 38 and the second RADAR module 26 at a second distance 40. The third RADAR module 28 has a third field of view 42 at least partially overlapping with each of the first and second fields of view 34, 36 behind the vehicle 12. Control circuitry 44 is in communication with the plurality of RADAR modules 24, 26, 28 and is configured to triangulate a position of the obstruction 30 between a first pair of the plurality of RADAR modules 24, 26, 28. The first distance 38 can be substantially equal to the second distance 40.

In some examples, the third RADAR module 28 is disposed between the first and second RADAR modules 24, 26. The third RADAR module 28 may be disposed centrally between the first and second RADAR modules 24, 26. For example, the first distance 38 may be between a quarter of (25%) and four times (400%) of the second distance 40. The first distance 38 may be between a half of (50%) and twice (200%) of the second distance 40. The third RADAR module 28 may be vertically spaced from the first and second RADAR modules 24, 26. The first RADAR module 24 may be vertically aligned with the second RADAR module 26. In further examples, the vehicle 12 includes a first taillight assembly 46 disposed at the rear 18 on the driver side 20, as well as a second taillight assembly 48 disposed at the rear 18 on the passenger side 22. The first and second RADAR modules 24, 26 are disposed in the first and second taillight assemblies 46, 48, respectively.

In some examples, the control circuitry 44 is configured to selectively execute a blind spot detection algorithm to determine an object 50 in a blind spot 52 of at least one of the driver side 20 and the passenger side 22 based on the positional data captured in the first and second fields of view 34, 36. The control circuitry 44 may also, or alternatively, selectively execute a cross-traffic detection algorithm to determine an object 50 is a cross-traffic area using the first and second fields of view 34, 36. For example, regions behind and to the right or left may be the cross-traffic areas where other vehicles may be detected during reversing of the vehicle 12. The vehicle 12 may further include a powertrain 54 in communication with the control circuitry 44. Selective execution of the blind spot 52 detection algorithm and the cross-traffic detection algorithm may be based on a gear status of the powertrain. For example, the control circuitry 44 may be configured to execute the blind spot detection algorithm and the cross-traffic detection algorithm when the gear status is not park. The control circuitry 44 is configured to execute a parking assist algorithm that guides steering of the vehicle 12 based on the positional data captured in both the third field of view 42 and at least one of the first and second fields of view 34, 36. The control circuitry 44 may be configured to select between the park assist algorithm and the blind spot 52 detection algorithm based on the gear status. For example, if the vehicle 12 is in reverse gear, the park assist mode may be activated.

In some examples, the vehicle 12 further includes a tailgate 56 at the rear 18 of the vehicle 12. The third RADAR module 28 may be operably coupled with the tailgate 56. The control circuitry 44 may further be configured to execute a gesture recognition algorithm that determines a gesture of a user behind the vehicle 12 based on the positional information captured in the third field of view 42. The control circuitry 44 may further be configured to execute the gesture recognition algorithm when the gear status is park.

In some examples, the control circuitry 44 is further configured to triangulate the position of the obstruction 30 between a second pair of the plurality of RADAR modules 24, 26, 28, compare the triangulation based on the second pair of the plurality of RADAR modules 24, 26, 28 to the triangulation based on the first pair of the plurality RADAR modules, and update the position based on the comparison.

Referring to FIGS. 1-6C, in a second example, the detection system 10 for the vehicle 12 includes the at least one time-of-flight device 14 configured to capture the positional information about cargo 58 in the vehicle 12 and the obstruction 30 outside the vehicle 12. The detection system 10 further includes control circuitry 44 that is in communication with the at least one time-of-flight device 14. The control circuitry 44 is configured to determine a location of the obstruction 30 relative to a rear 18 of the vehicle 12. The control circuitry 44 is further configured to calculate a length 60 of at least one overhang 62, 64 of the cargo 58 based on the positional information, estimate a lateral position 66 of the at least one overhang 62, 64 based on the positional information, determine at least one endpoint 68, 70 of the cargo 58 based on the lateral position 66 and the length 60, determine at least one potential contact point 72, 74 between the cargo 58 and the obstruction 30 based on the location and the at least one endpoint 68, 70, and generate an output based on the at least one potential contact point 72, 74. The detection system 10 of the present example may provide for enhanced availability when adjusting a position of the vehicle 12 by identifying additional space for movement of the vehicle 12 while limiting potential contact.

In some examples, the cargo 58 includes a first object 78 and a second object 80. The control circuitry 44 is further configured to determine a first endpoint 68 for the first object 78 based on the length 60 and the lateral position 66 of a first overhang 62 of the first object 78. The control circuitry 44 is further configured to determine a second endpoint 70 for the second object 80 based on the length 60 and a lateral position 66 of a second overhang 64 of the second object 80. The control circuitry 44 is further configured to determine a first potential contact point 72 between the first object 78 and the obstruction 30 based on the first endpoint 68. The control circuitry 44 is further configured to determine a second potential contact point 74 between the second object 80 and the obstruction 30 based on the second endpoint 70.

In some examples, the control circuitry 44 is further configured to compare the first potential contact point 72 with the second potential contact point 74 and calculate a steering profile 82 based on the comparison of the first potential contact point 72 with the second potential contact point 74. The detection system 10 may further include a steering system 84 that adjusts a steering angle of the vehicle 12 in response to the steering profile 82. A display 88 may be in communication with the control circuitry 44 and configured to present an indication of the steering profile 82 for the steering system 84 in response to the output. The indication may include an adjustment for the steering angle to align with the steering profile 82.

In some examples, the control circuitry 44 is further configured to determine a clearance zone between the first and second potential contact points 72, 74 based on the location of the obstruction 30. The detection system 10 may further include a brake system 92 that adjusts a speed of the vehicle 12 in response to the output. The control circuitry 44 may further be configured to determine a proximity of the cargo 58 to at least one of the first potential contact point 72 and the second potential contact point 74 and communicate an instruction to the brake system 92 to adjust the speed of the vehicle 12 in response to the proximity.

In some examples, the display 88 is configured to present the at least one potential contact point 72, 74 in response to the output. The at least one time-of-flight device 14 may include the plurality of RADAR modules 24, 26, 28 disposed along the rear 18 of the vehicle 12 and configured to detect the obstruction 30 behind the vehicle 12. The plurality of RADAR modules 24, 26, 28 includes the first RADAR module 24 aligned with the driver side 20 of the rear 18 and the second RADAR module 26 aligned with the passenger side 22 of the rear 18. The plurality of RADAR modules 24, 26, 28 includes the third RADAR module 28 disposed between the first and second RADAR modules 24, 26. The third RADAR module 28 may be disposed above or below each of the first and second RADAR modules 24, 26.

Referring to FIGS. 1-5 and 7-11, in a third example, the vehicle 12 includes a passenger compartment 94 having a side, such as a sidewall 96 or outer wall of the passenger compartment 94, and an upper wall 98 that extends from the side in an upper plane. An extension 100 extends from the side of the passenger compartment 94 to an end 102 that extends in an end plane. The at least one time-of-flight device 14 is configured to capture positional information about the obstruction 30 outside the vehicle 12. The control circuitry 44 is in communication with the at least one time-of-flight device 14 and is configured to define a space above the extension 100 between the side, the upper plane, and the end plane. For example, the space may be one of a plurality of voids 106 around the vehicle mapped by the control circuitry 44. The control circuitry 44 is further configured to calculate, based on the positional information, an available position for the vehicle 12 having the obstruction 30 in the space. The control circuitry 44 is further configured to generate an output in response to the available position. This arrangement may provide for enhanced spatial utilization when maneuvering the vehicle 12.

In some examples, the vehicle 12 further includes the powertrain 54 that moves the vehicle 12 in a motion direction. The control circuitry 44 may further be configured to communicate an instruction to adjust the powertrain in response to the calculation of the available position. The control circuitry 44 may further be configured to determine a first potential contact point 72 between the obstruction 30 and the end 102, determine a second potential contact point 74 between the obstruction 30 and the sidewall 96, and compare the first and second potential contact points 72, 74 to calculate the available position. The instruction to adjust the powertrain may be based on the comparison.

In some examples, the control circuitry 44 is further configured to calculate a first contact distance 112 between the first potential contact point 72 and the end 102. The control circuitry 44 is further configured to calculate a second contact distance 114 between the second potential contact point 74 and the sidewall 96. The control circuitry 44 is further configured to assign a maximum travel for the vehicle 12 in the motion direction to one of the first contact distance 112 and the second contact distance 114. The control circuitry 44 may further be configured to assign the maximum travel based on the shorter of the first contact distance 112 and the second contact distance 114.

In some examples, the vehicle 12 includes the brake system 92 that adjusts the speed of the vehicle 12 in response to the maximum travel. The extension 100 may include an outer compartment 118 of the vehicle 12. For example, the outer compartment 118 may be a trunk or a frunk of the vehicle 12. The space may be defined above a trunk 120 or a hood 122 of the vehicle 12, though other spaces (e.g., spaces under the chassis, above the hood, or any other spaces around the vehicle 12) may be defined between a boundary box 196 (FIG. 7) around the vehicle 12 and the vehicle 12 itself.

In some examples, the outer compartment 118 is a bed 124 of a truck 126. The vehicle 12 may further include a cover 128 that is selectively disposed in the space for covering the bed 124 of the truck 126. For example, the cover 128 may be a cap for the vehicle 12 that selectively covers the outer compartment 118 (e.g., a detachable truck cap). The control circuitry 44 may be configured to determine the presence of the cover 128. An input may be in communication with the control circuitry 44 and configured to detect the cover 128. For example, the input may be a signal generated by a detection sensor that monitors the presence of the cover 128. The vehicle 12 may further include the steering system 84 that adjusts the steering angle of the vehicle 12 to align the vehicle 12 with the available position.

Referring to FIGS. 1-5 and 12-16C, in a fourth example, the detection system 10 for the vehicle 12 includes the at least one time-of-flight device 14 that is configured to capture positional information about a contour of a towable device 130 outside the vehicle 12. The detection system 10 further includes a user interface configured to present messages to a user. The control circuitry 44 is in communication with the at least one time-of-flight device 14 and the user interface. The control circuitry 44 is configured to calculate a tilt 131 of the contour based on the positional information about the contour, compare the tilt 131 to a threshold angle 132 for the contour, determine at least one stability condition of the towable device 130 based on the comparison of the tilt 131 to the threshold angle 132, and communicate an instruction to the user interface to indicate the at least one stability condition. The detection system 10 may provide for detecting unstable conditions or potentially unstable conditions of the towable device 130 by employing the enhanced arrangement of time-of-flight sensors, according to some aspects of the present disclosure.

It is contemplated that the towable device 130 may embody any apparatus or device configured to be coupled with (e.g., hitched) to the vehicle 12 to allow the vehicle 12 to tow the towable device 130. For example, the towable device may be another vehicle, such as a recreational vehicle (RV) or an automotive vehicle (e.g., car, truck), a towable device, a camper, or any other towable device 130.

According to some examples, the towable device 130 is operably coupled with the vehicle 12. The contour may include a front wall 138 of the towable device 130, and the control circuitry 44 may further be configured to calculate a pitch of a floor 142 of the towable device 130 based on the tilt 131 of the front wall 138. For example, the pitch may be in angular deviation from a driving surface 144 under the vehicle 12 in an inclined or declined position. The control circuitry 44 may further be configured to determine a topography 146 of an area behind the vehicle 12 based on the pitch. For example, the control circuitry 44 may determine the presence of an incline or decline behind the vehicle 12. The towable device 130 may be a dump trailer 150 having the floor 142 pivotable relative to a frame 152 of the towable device ¹130. A lift unit 153 may be in communication with the control circuitry 44 and configured to adjust the pitch of the floor 142 of the dump trailer 150.

According to some examples, the at least one stability condition includes an unstable condition corresponding to the pitch exceeding the threshold angle 132. The control circuitry 44 may further be configured to communicate an instruction to interrupt the lift unit 153 adjusting the pitch in response to the unstable condition. The control circuitry 44 may further be configured to estimate a length of the towable device 130 based on the positional information and calculate the threshold angle 132 based on the length of the towable device 130. The detection system 10 may further include an input indicating a loaded state or an unloaded state of the towable device 130. The control circuitry 44 may be configured to adjust threshold angle 132 based on the input. The input may be a signal from one of a selection at the user interface and a weight sensor 154 for the towable device 130. For example, the weight sensor 154 may be operably coupled with the floor 142 of the towable device 130 and configured to provide weight information wirelessly or over a wired connection to the control circuitry 44 to indicate a weight of the towable device 130.

The at least one time-of-flight device 14 may include the plurality of RADAR modules 24, 26, 28 arranged near the tailgate 56 of the vehicle 12. A pair of the plurality of RADAR modules 24, 26, 28 are disposed in the taillight assemblies 46, 48 of the vehicle 12. In some examples, at least one of the plurality of RADAR modules 24, 26, 28 is disposed in another lighting assembly, such a headlight assembly 158, 160 of other lighting assembly that illuminates the region exterior 32.

Referring now to FIG. 1, the vehicle 12 may be a truck 126 having the bed 124 selectively accessible via the tailgate 56. For example, the tailgate 56 may have a handle 156 for selectively opening or closing the tailgate 56. The third RADAR module 28 may be disposed adjacent to the handle 156 for the tailgate 56 and vertically offset from the first and second RADAR modules 24, 26 in the first and second taillight assemblies 46, 48, respectively. Although illustrated as a truck 126, it is contemplated that the vehicle 12 may be any automotive vehicle, such as a car, a van, a sedan, a sport utility vehicle, or any other automotive vehicle. Further, it is contemplated that the plurality of RADAR modules 24, 26, 28 may be positioned additionally, or in an alternative, at the front 16 of the vehicle 12, such as having the first and second RADAR modules 24, 26 disposed in first and second headlight assemblies 158, 160 of the vehicle 12. In this example, the third RADAR module 28 may be disposed between the first and second RADAR modules 24, 26 at, above, or below, the first and second RADAR modules 24, 26. In general, a triangular arrangement of the plurality of RADAR modules 24, 26, 28 may be provided along the front 16 or rear 18 of the vehicle for monitoring areas in front of or behind the vehicle 12.

The time-of-flight devices 14 described herein may refer to the RADAR modules 24, 26, 28 as described, or may refer to any other time-of-flight device 14, such as a light detection and ranging unit (LiDAR), a Sound Navigation and Ranging (Sonar) unit, or any other time-of-flight device 14. In general, the arrangement of the time-of-flight devices 14 relative to the motion direction of the vehicle 12 may provide for the enhanced range of detection and locating of the present detection system 10. The RADAR may have a range of between 70 and 90 gigahertz (GHz), though other RADAR ranges may be employed. For example, the RADAR may be between 76 GHz and 81 GHz.

Figure 2:
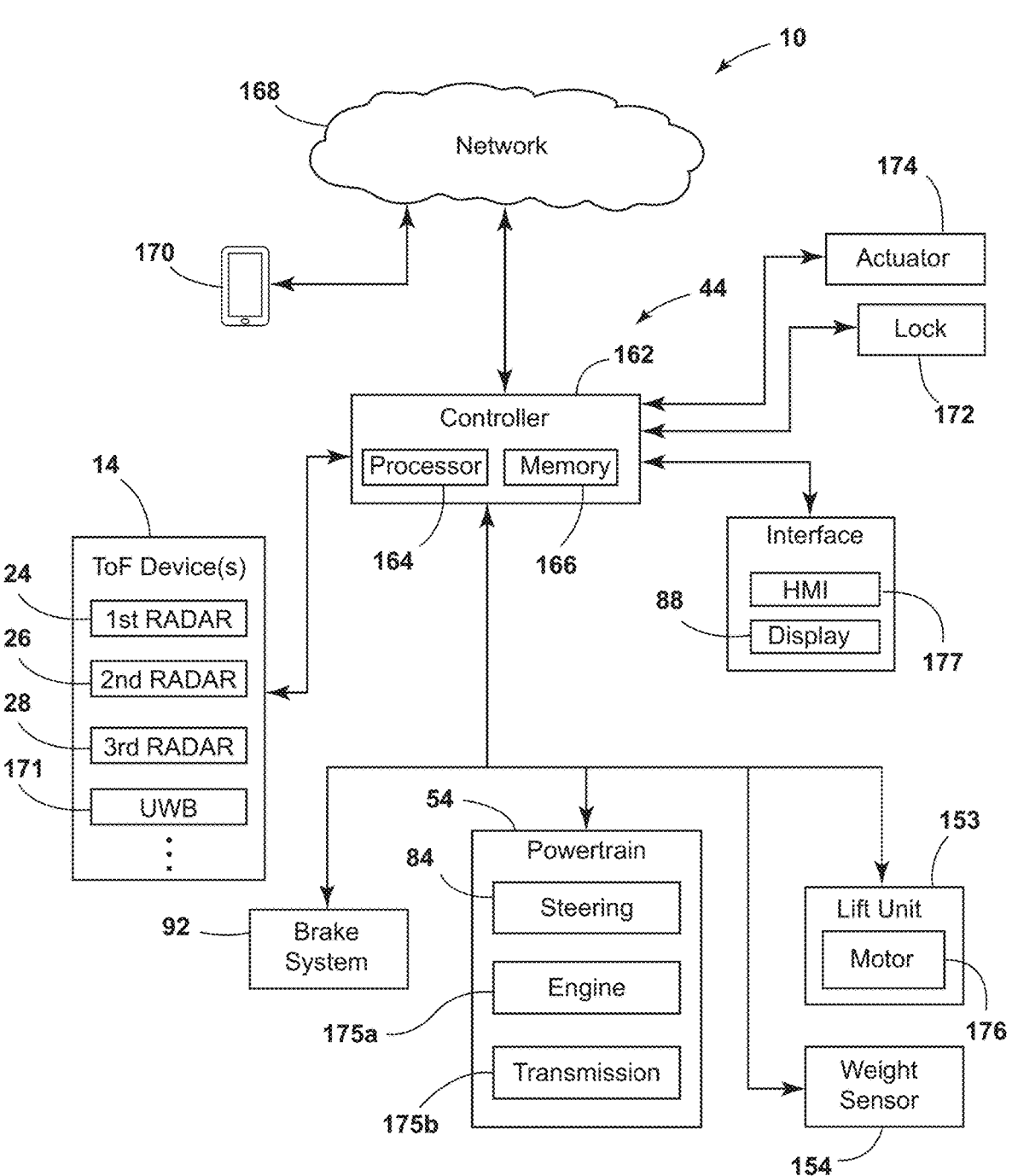
FIG. 2 is a block diagram of an exemplary detection system for use in a vehicle environment according to one aspect of the present disclosure.

Referring now to FIG. 2, an exemplary functional diagram of the control circuitry 44 of the detection system 10 of the present disclosure is shown. The control circuitry 44 may include a controller 162 having a processor 164 and a memory 166 that stores instructions. The processor 164 may execute the instructions to cause the controller 162 to operate the time-of-flight devices 14 and control one or more of the brake system 92, the powertrain 54, the lift unit 153, or another vehicle system in response to the positional data collected by the plurality of RADAR modules 24, 26, 28. In some examples, the control circuitry 44 may communicate signals to adjust the frequencies of the radio waves emitted by the RADAR modules 24, 26, 28 and/or an orientation of the emissions of radio waves to focus on particular regions around the vehicle 12. In other examples, the RADAR modules 24, 26, 28 operate in a constant detection mode and the processor 164 operates in variable algorithms depending on the particular operation performed by the detection system 10. For example, the control circuitry 44 may be configured to operate in the blind spot detection mode, the park assist mode, or a backup assist mode. Depending on the particular mode selected, the processor 164 may execute different instructions that causes the processor 164 to read segments of the data collected by the plurality of RADAR modules 24, 26, 28. Stated differently, the different operating modes for the processor 164 may be associated with different locations around the vehicle 12 to be monitored and, as a result, the positional data from each of the time-of-flight devices 14 may be read at varying rates or sampled at different frequencies in order to analyze the positional data pertinent to that particular location. In this way, computational power and latency may be enhanced by the detection system 10.

In some examples, the control circuitry 44 is configured to compare the positional data captured by the plurality of RADAR modules 24, 26, 28 in order to triangulate the positions of the objects 50, 78, 80 or obstructions 30 around the vehicle 12. For example, the time-of-flight of radio waves emitted and received from the first RADAR modules 24 may be compared to the time-of-flight of radio waves emitted received by the second RADAR module 26 in order to triangulate the position of the obstruction 30.

The detection system 10 further includes a wireless network 168 that may provide for communication between the control circuitry 44 and one or more mobile devices 170. For example, the wireless network 168 may be operable with Wi-Fi®, Bluetooth®, ZigBee®, SMS, or any other wireless communication protocol, such as any short- or long-wave communications. The mobile device 170 may incorporate ultra-wideband (UWB) RADAR functionality and serve as one of the plurality of RADAR modules 24, 26, 28 (e.g., a fourth RADAR module). For example, a user may be positioned near the tailgate 56 and may use the mobile device 170 to guide a driver of the vehicle 12 or guide steering of the vehicle 12 and a backing up operation by employing the RADAR module in the mobile device 170 to gather additional positional data about obstructions 30 or objects 50, 78, 80 behind the vehicle 12. In addition, or in an alternative, the RADAR modules 24, 26, 28 on the vehicle 12 may detect the presence of the user near the tailgate 56 and control opening or closing of the tailgate 56 based on the location of the user. For example, the detection system 10 may include an electronic door lock 172 and/or an actuator 174 configured to control opening or closing of the tailgate 56. Based on the detection of the user within an opening path of the tailgate 56, the control circuitry 44 may limit movement of the tailgate 56 when the user, or another obstruction 30, is within the opening movement. When the tailgate 56 is in the open position, a pair of the plurality of RADAR modules 24, 26, 28 may be configured to detect the presence of the user and limit a closing movement of the tailgate 56 based on the user being within a region near the tailgate 56.

In some examples, the at least one time-of-flight device 14 includes UWB transceivers 171, or beacons/antennas, positioned at the rear 18 of the vehicle 12. For example, the UWB transceivers 171 may be incorporated in rear corners and front corners of the vehicle 12 to provide 360° of RADAR coverage around the vehicle 12. The UWB transceivers 171 may provide for enhanced locating functionality to detect precise location of the objects 50, 78, 80 proximate to the vehicle 12.

With continued reference to FIG. 2, the powertrain 54 may include the steering system 84, an engine 175a of the vehicle 12, a transmission system 175b of the vehicle 12, or any other system configured to control movement of the vehicle 12. As will be described further herein, the control circuitry 44 may be configured to adjust steering of the vehicle 12 in response to the positional information captured by the RADAR modules 24, 26, 28. In some examples, the gear state of the transmission may be accessed by the control circuitry 44 and be employed to determine the operational mode for the processor 164. In other examples that will be described in reference to FIGS. 12 through 16C, the control circuitry 44 may be in communication with the lift unit 153 of the dump trailer 150 that may be operably coupled with the vehicle 12. The lift unit 153 may incorporate any electromechanical actuating device such as a motor 176 or a hydraulic unit that may drive the floor 142 of the tractor upwardly and downwardly, as will be described further herein. Further, the weight sensor 154 may be in communication with the control circuitry 44 to allow the control circuitry 44 to determine various states of the towable device 130 as will be further described herein.

Still referring to FIG. 2, a human-machine interface (HMI) may be provided in the vehicle 12 to allow the user to interact with various aspects of the detection system 10. For example, the HMI may incorporate the display 88 and may serve as the interface 177 previously described. In some examples, the mobile device 170 serves as the interface 177 and the display 88. For example, the steering profile 82, the stability conditions for the towable device 130, the presence and location of objects 50, 78, 80 or obstructions 30, and available parking positions or other movements of the vehicle 12 may be presented at the display 88 in the form of an image, text, numbers, or any other indication of detection by the detection system 10.

Figure 3:
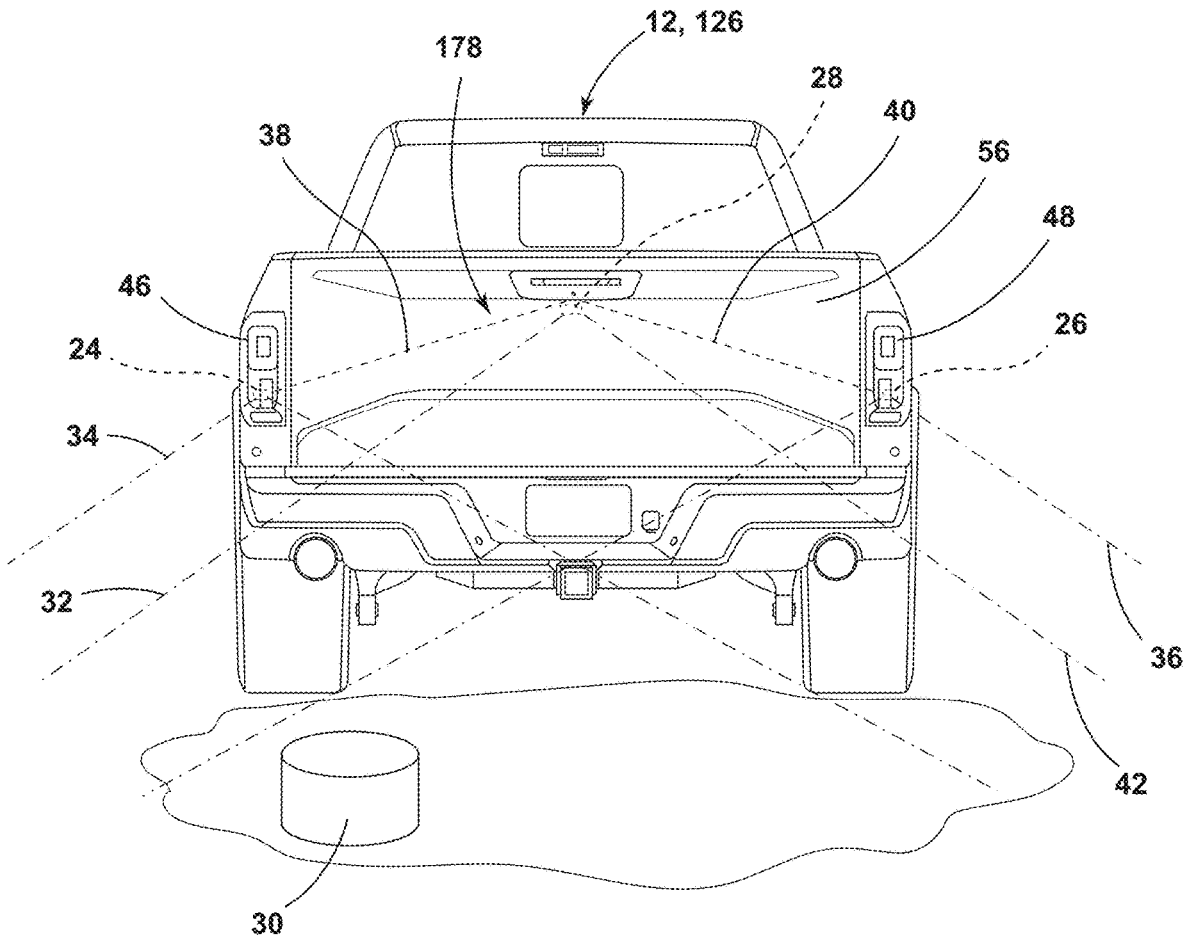
FIG. 3 is a rear perspective view illustrating geometric relationships between time-of-flight sensors employed at a rear of a vehicle and demonstrating fields of view of the time-of-flight sensors.

Referring now more particularly to FIG. 3, a geometric arrangement 178 for the three RADAR modules 24, 26, 28 is illustrated in the tailgate 56 of the vehicle 12. More particularly, the first and second RADAR modules 24, 26 are incorporated into the first and second taillight assemblies 46, 48, respectively, and the third RADAR module 28 is incorporated centrally within the tailgate 56. In this exemplary arrangement 178, the first distance 38 is substantially equal to the second distance 40, and the third RADAR module 28 is vertically, or vehicle-upwardly, offset from the first and second RADAR modules 24, 26 which are in a common horizontal plane. Thus, the arrangement 178 of the plurality of RADAR modules 24, 26, 28 forms an isosceles triangular arrangement 178 to provide for enhanced scanning and detection equally between the driver side 20 or the passenger side 22 behind the vehicle 12. Further, by providing a vertical offset between at least a pair of the RADAR modules 24, 26, 28, an expansive field of view amongst the three fields of view 34, 36, 42 may be provided. For example, the third field of view 42 may overlap with the first and second fields of view 34, 36 in a smaller region than if all of the RADAR modules 24, 26, 28 were vertically aligned with one another.

Referring generally to FIGS. 2 and 3, control circuitry 44 may further be configured to execute the gesture recognition algorithm and utilize the positional information captured from the RADAR modules 24, 26, 28. For example, when the user is near the rear 18 of the vehicle 12, the position of the user may be identified via the RADAR modules 24, 26, 28 and various gestures of the user may be detected based on the positional information gathered by the RADAR modules 24, 26, 28. For example, raising of the foot, moving of the hands, or other movements of the body of the user may be detected based on the positional information in the fields of view 34, 36, 42 and cause opening or closing of the tailgate 56. As previously described, the opening or closing of the tailgate 56 may be limited based on the location of the user. For example, various gestures to open or close the tailgate 56 may be detected from close or far distances from the vehicle 12 within the fields of view 34, 36, 42 of the RADAR modules 24, 26, 28. In some examples, the control circuitry 44 executes the gesture recognition algorithm when the gear state is park and the engine is on. Continuing with this example, when the vehicle 12 is in reverse, the park assist operating mode may be activated. The park assist mode may include the cross-traffic detection algorithm. For example, the park assist mode may cause the first and second RADAR modules 24, 26 to scan the cross traffic areas when the gear status is reverse. When the gear status is drive, the control circuitry 44 may execute the blind spot 52 detection algorithm. By providing the redundancy of the plurality RADAR modules on the vehicle 12, multi-mode functionality for the detection system 10 may be provided.

The arrangement 178 of the RADAR modules 24, 26, 28 may further provide for enhanced redundancy in the event of limited functionality of one of the three RADAR modules 24, 26, 28. Further, by providing the arrangement of the plurality of RADAR modules 24, 26, 28, ultrasonic sensors typically incorporated in bumpers or other exterior portions of the vehicle 12 may be omitted to provide enhanced efficiency in manufacturing. Accordingly, cutouts for ultrasonic sensors and multiple wired connections may be reduced.

Figure 4:
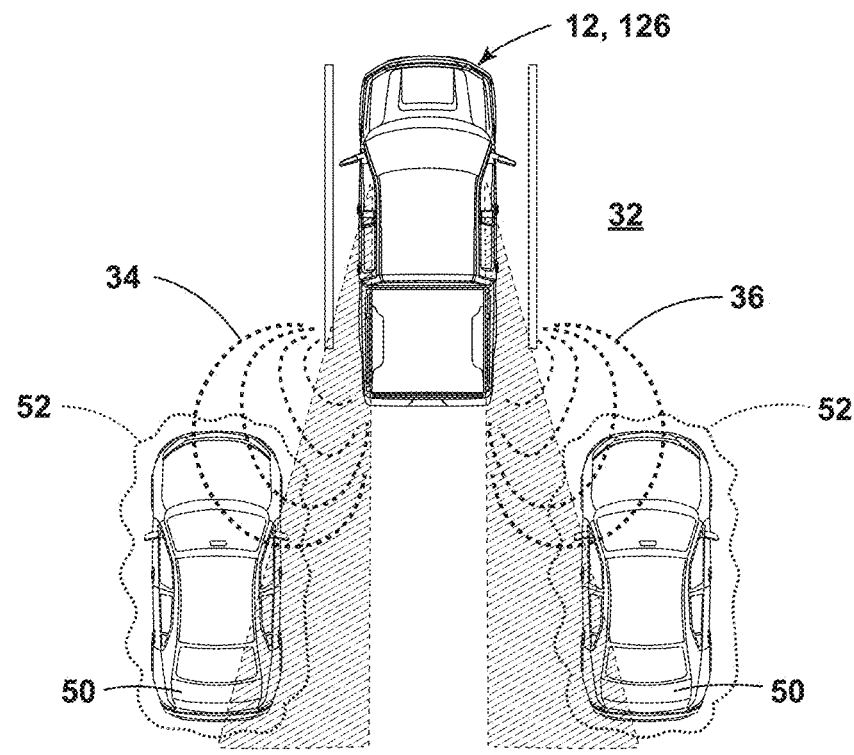
FIG. 4 is a top view of a vehicle utilizing time-of-flight sensors to execute a blind spot detection algorithm initiated by control circuitry of the present disclosure.
Figure 5:
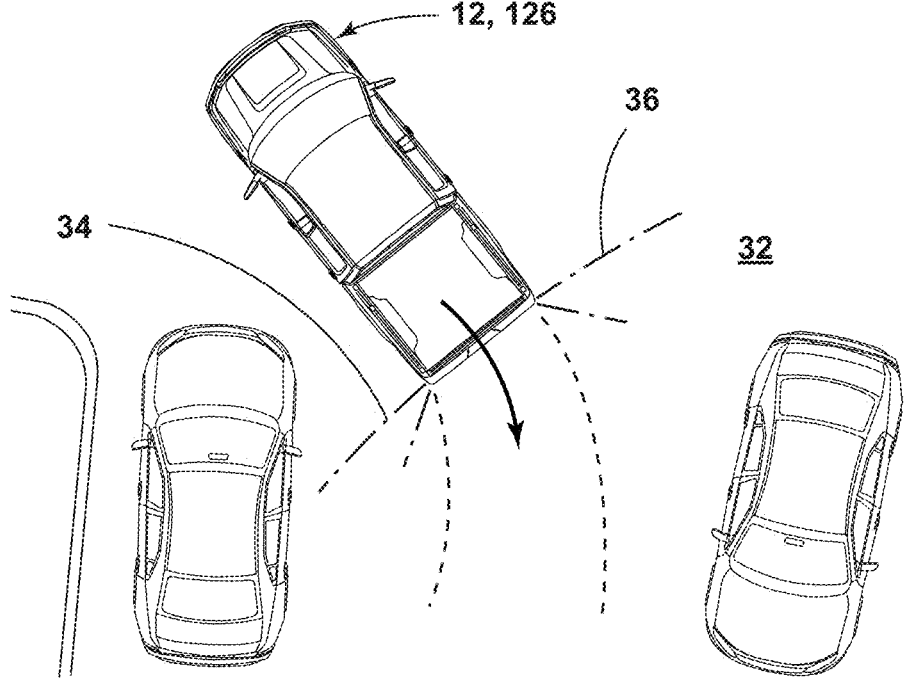
FIG. 5 is a top view of a vehicle utilizing time-of-flight sensors to execute a park assist algorithm initiated by control circuitry according to one aspect of the present disclosure.

Referring now to FIGS. 4 and 5, examples of the blind spot detection algorithm (FIG. 4) and the park assist algorithm (FIG. 5) are illustrated. As shown, the first and second RADAR modules 24, 26 incorporated into the taillight assemblies 46, 48 may allow for dual functionality of the RADAR modules 24, 26, 28 for various operations of moving the vehicle 12. As previously described, incorporation of the third RADAR module 28 may allow for greater redundancy in the event of limited functionality of at least one of the RADAR modules 24, 26, 28 to allow for the blind spot detection algorithm and the park assist algorithm to be executed with two RADAR modules 24, 26.

Figure 6A:
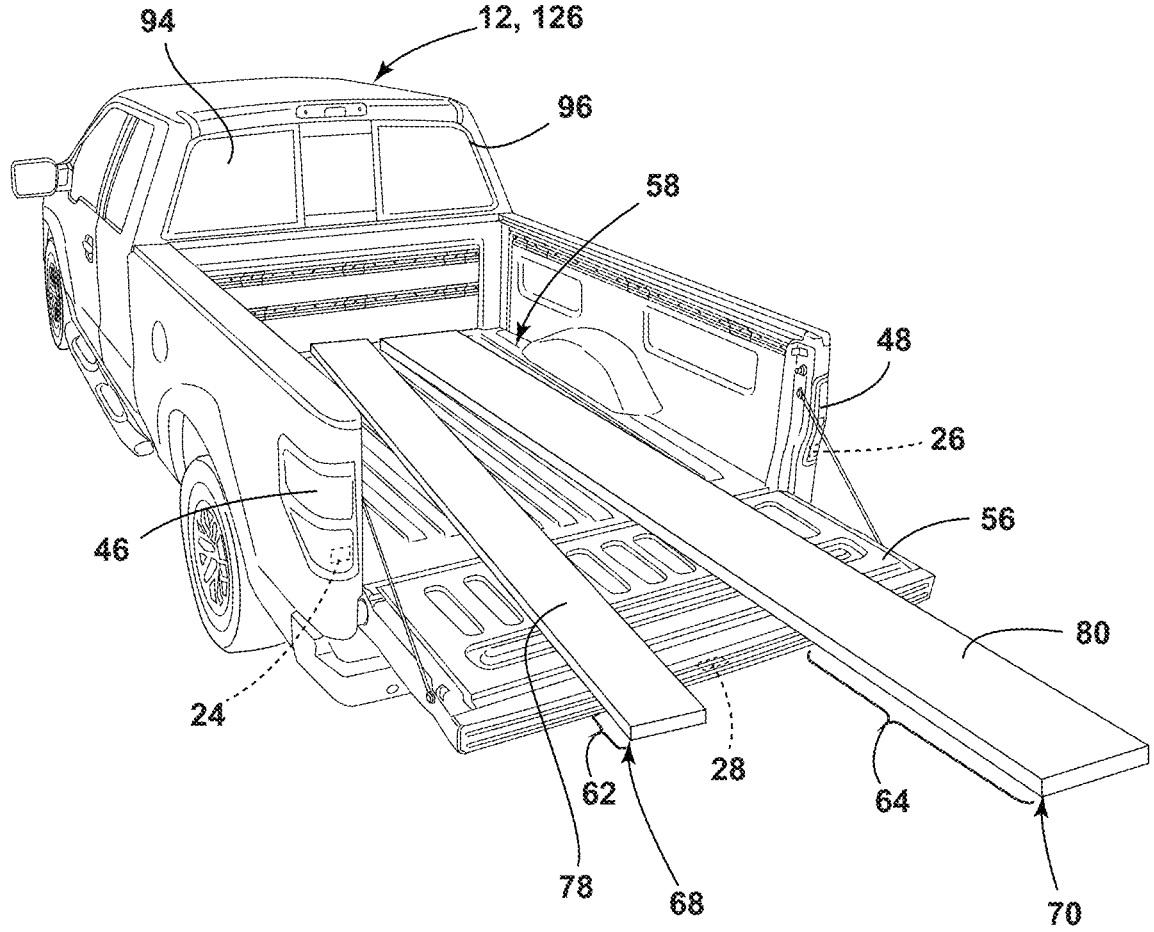
FIG. 6A is a rear perspective view of a bed of a truck housing cargo overhanging the bed of the truck.
Figure 6B:
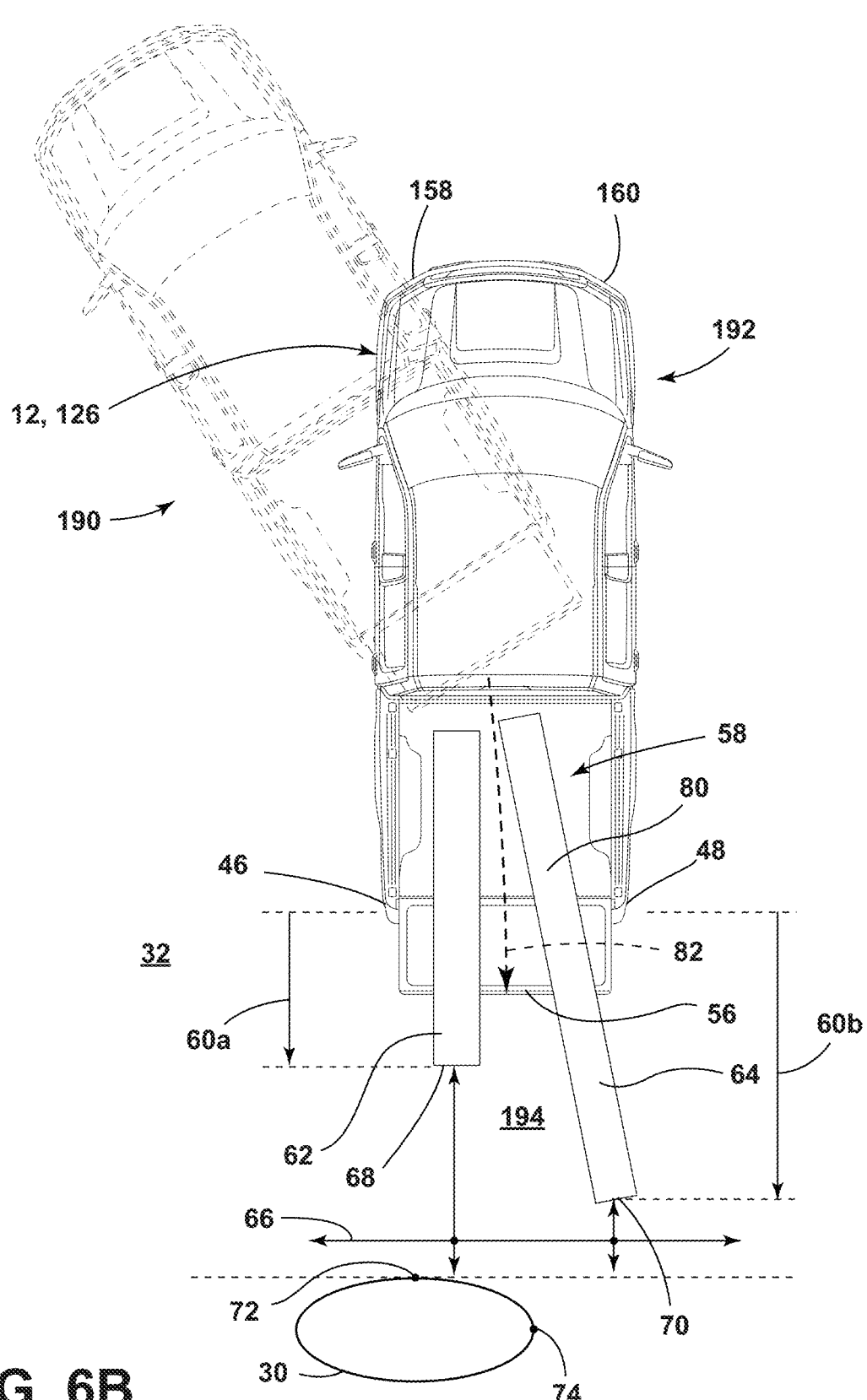
FIG. 6B is a top view of the vehicle of FIG. 6A, demonstrating the cargo having different overhanging lengths off of the bed of the truck.
Figure 6C:
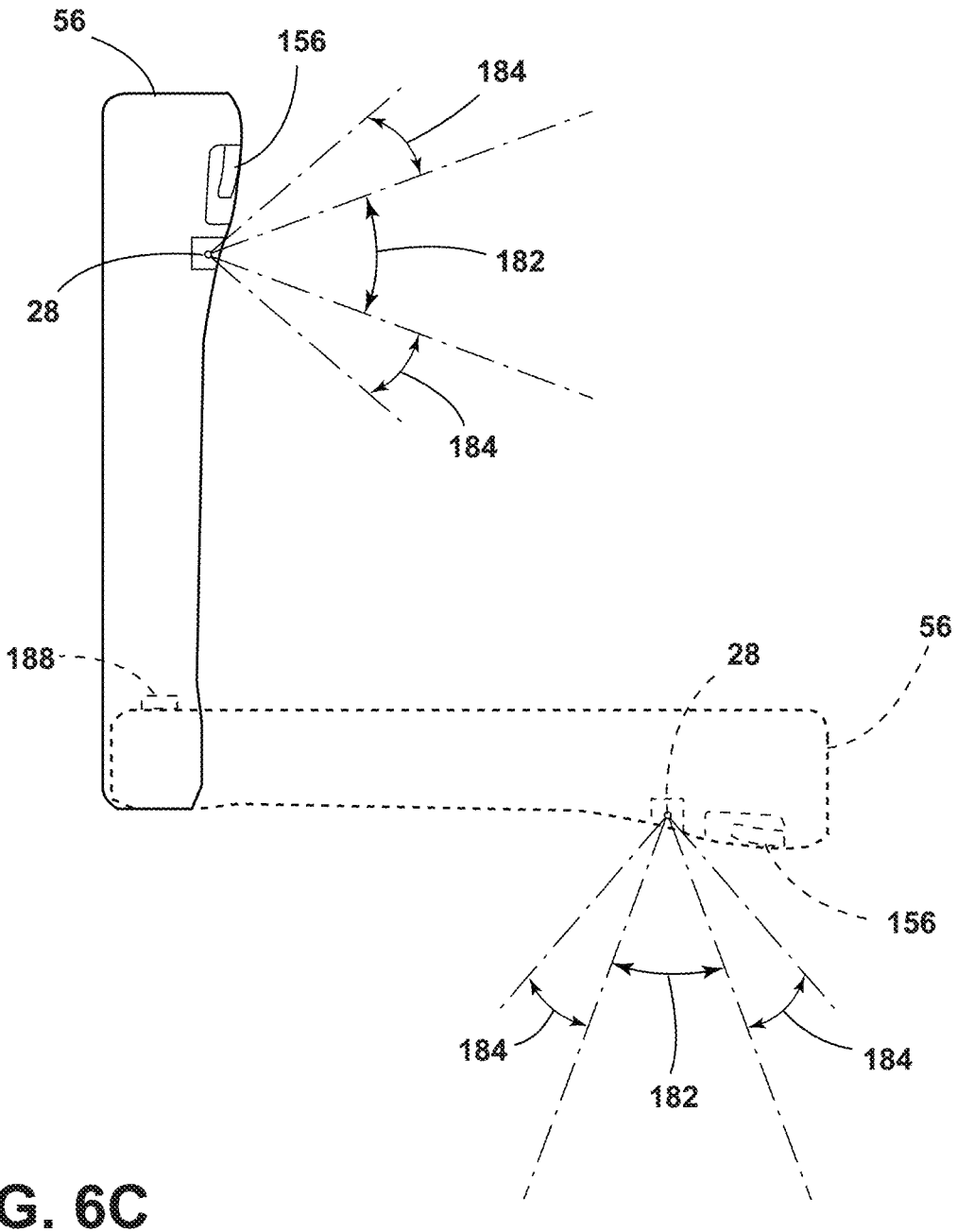
FIG. 6C is a side view of a tailgate in a closed position and an opened position in phantom.

Referring now to FIGS. 6A and 6B, the plurality of RADAR modules 24, 26, 28 may be employed for detection of extended loads within the vehicle 12. For example, the cargo 58 in the bed 124 of the truck 126 may extend beyond the rear 18 of the truck 126. In such an example, the effective length 180 of the vehicle 12 may be the length of the vehicle 12 plus the overhang 62, 64 of the cargo 58. Accordingly, by detecting the at least one endpoint 68, 70 of the at least one overhang 62, 64 using the positional information from the RADAR sensors, the present detection system 10 may allow the control circuitry 44 to provide an enhanced estimate for maneuvering of the vehicle 12. For example, changing lanes of the vehicle 12 without interaction with or contact with another vehicle or another item may be limited by providing these detection techniques. In addition, or in an alternative, the detection system 10 may enhance the blind spot detection algorithm by incorporating the length 60 of the at least one overhang 62, 64 into estimation of available maneuvering of the vehicle 12. Accordingly, the detection system 10 may provide for enhanced functionality to detect and characterize lengths of extended loads on the vehicle 12.

Still referring to FIGS. 6A and 6B, the three fields of view 34, 36, 42 of the three RADAR modules 24, 26, 28 may be oriented for accessibility to the tailgate 56 and for blind spot 52 identification as described previously. In this example, the control circuitry 44 may modify operation of the third RADAR module 28 to monitor positional information captured from a direction that would ordinarily be upward when the tailgate 56 is in the closed position. For example, the control circuitry 44 may operate a tailgate-open algorithm and a tailgate-closed algorithm in which, depending on the algorithm executed, positional data captured from an upward angle of the radio waves are monitored or radio waves captured in a downward orientation are monitored. For example, with reference to FIG. 6C, in the closed position of the tailgate 56 (e.g., the tailgate 56 is up), the control circuitry 44 may actively read data captured in a first angular range 182 (e.g., between 45° and 60° from center) and ignore data captured in a second angular range 184 (e.g., between 1° and 45° outside of the first angular range 182). However, when the tailgate 56 is the open position (e.g., the tailgate 56 is down), the control circuitry 44 may actively read positional information captured in the second angular range 184 and ignore positional information captured in the first angular range 182. Accordingly, detection of the tailgate 56 position may be determined based on the positional information generated by the first and second RADAR modules 24, 26. In other examples, various sensors, such as the weight sensor 154, a door open/closed sensor 188, or any other detection sensor may be employed by the detection system 10 and in communication with the control circuitry 44 to determine the position of the tailgate 56.

Referring back to FIGS. 6A and 6B, when the extended load is present and detected by the RADAR modules 24, 26, 28, each of the RADAR modules 24, 26, 28 may be focused or oriented toward detection of the length 60 of the at least one overhang 62, 64. With particular reference to FIG. 6B, gaps 194 may be identified within the at least one overhang 62, 64 that may allow for enhanced spatial optimization for maneuvering of the vehicle 12. For example, a reversing operation of the vehicle 12 is shown with a steering profile 82 for the vehicle 12 between an initial position 190 and an intermediate position 192. In the example in which the cargo 58 includes a plurality of objects (e.g., the first object 78 and the second object 80), each object 78, 80 has an overhang 62, 64 of the length 60. Depending on the lateral position 66 (e.g., the passenger side 22 to driver side 20 direction) the obstruction 30 may be limited from contact with the vehicle 12 or the cargo 58 while allowing the vehicle 12 to move to a target location near the instruction by utilizing the gaps 194 identified by the control circuitry 44. For example, the control circuitry 44 may determine the first potential contact point 72 between the first endpoint 68 and the obstruction 30 and the second potential contact point 74 between the second endpoint 70 and the obstruction 30. The potential contact points 72, 74 may be determined utilizing the lateral position 66 as calculated based on the positional information gathered by the plurality of RADAR modules 24, 26, 28. Based on these potential contact points 72, 74, the control circuitry 44 may communicate instructions to the steering system 84 to adjust the steering angle of the vehicle 12 to align with the steering profile 82 for the maneuvering of the vehicle 12.

As described, the gaps 194 identified based on the positional information may serve as a clearance zone between the potential contact points 72, 74. For example, as demonstrated in FIG. 6B, the first object 78 and the second object 80 have different lengths 60 of overhang 62, 64 in the vehicle-rearward direction, and therefore, the clearance zone is on the driver side 20 of the vehicle 12 for the obstruction 30. Accordingly, in this example, the vehicle 12 may back up to a position in which the obstruction 30 is in the clearance zone. The control circuitry 44 may communicate instructions to adjust the steering to provide for this position. In an alternative, the control circuitry 44 may communicate instructions to indicate to the driver the clearance zone and the available positions for maneuvering the vehicle 12.

In addition to the parking assistance features provided by the detection system 10 as described, cross-traffic alert operations performed by the control circuitry 44 and/or the blind spot 52 detection algorithms executed by the control circuitry 44 may be enhanced by utilizing the positional information captured by the three RADAR modules 24, 26, 28. Accordingly, the clearance zones determined by the control circuitry 44 may allow for enhanced maneuverability of the vehicle 12 in various scenarios.

As previously described with respect to FIG. 2, the display 88, such as the display 88 of the human-machine interface 177 and/or the mobile device 170, may be configured to present an indication of the clearance zone and/or the steering profile 82 to guide the user in controlling the vehicle 12 to limit contact with the obstruction 30. Further, the brake system 92 may be controlled via instructions from the control circuitry 44 in response to proximity to the obstruction 30. In this way, the vehicle 12 may be guided to limit contact with the instruction using enhanced positional information, such as lengths 60 of the overhangs 62, 64.

In other nonlimiting examples, the plurality of RADAR modules 24, 26, 28 may be employed to detect a water surface and a water level when backing up the vehicle 12 or pulling a marine vessel at the entry of a body of water. For example, as will be described in reference to FIGS. 12-16C, if the marine vessel is present on the towable device 130, the first and second RADAR modules 24, 26 may detect the length of the towable device 130 and therefore the length of the marine vessel to allow the control circuitry 44 to determine whether the marine vessel is in the body of water. In this way, the arrangement 178 of the RADAR modules 24, 26, 28 may limit the vehicle 12 from entering the body of water. Accordingly, the control circuitry 44 may communicate with the powertrain 54 and/or the brake system 92 to indicate to the user or to automatically adjust the powertrain and/or the brake system 92 based on estimation of how far the marine vessel is in the body of water.

Referring now to FIG. 7-11, the detection system 10 may be employed for enhanced spatial availability when maneuvering a vehicle 12, such as during a parking operation for the vehicle 12, reversing the vehicle 12, or advancing the vehicle 12 when a driving surface 144 of the region exterior 32 to the vehicle 12 or under the vehicle 12 is uneven, slanted, or has unexpected features. Further, the detection system 10 may provide for enhanced spatial optimization for obstructions 30 above the vehicle 12, below the vehicle 12, or otherwise near the vehicle 12 that may be disposed in voids 106 within a boundary box 196 of the vehicle 12.

Figure 7:
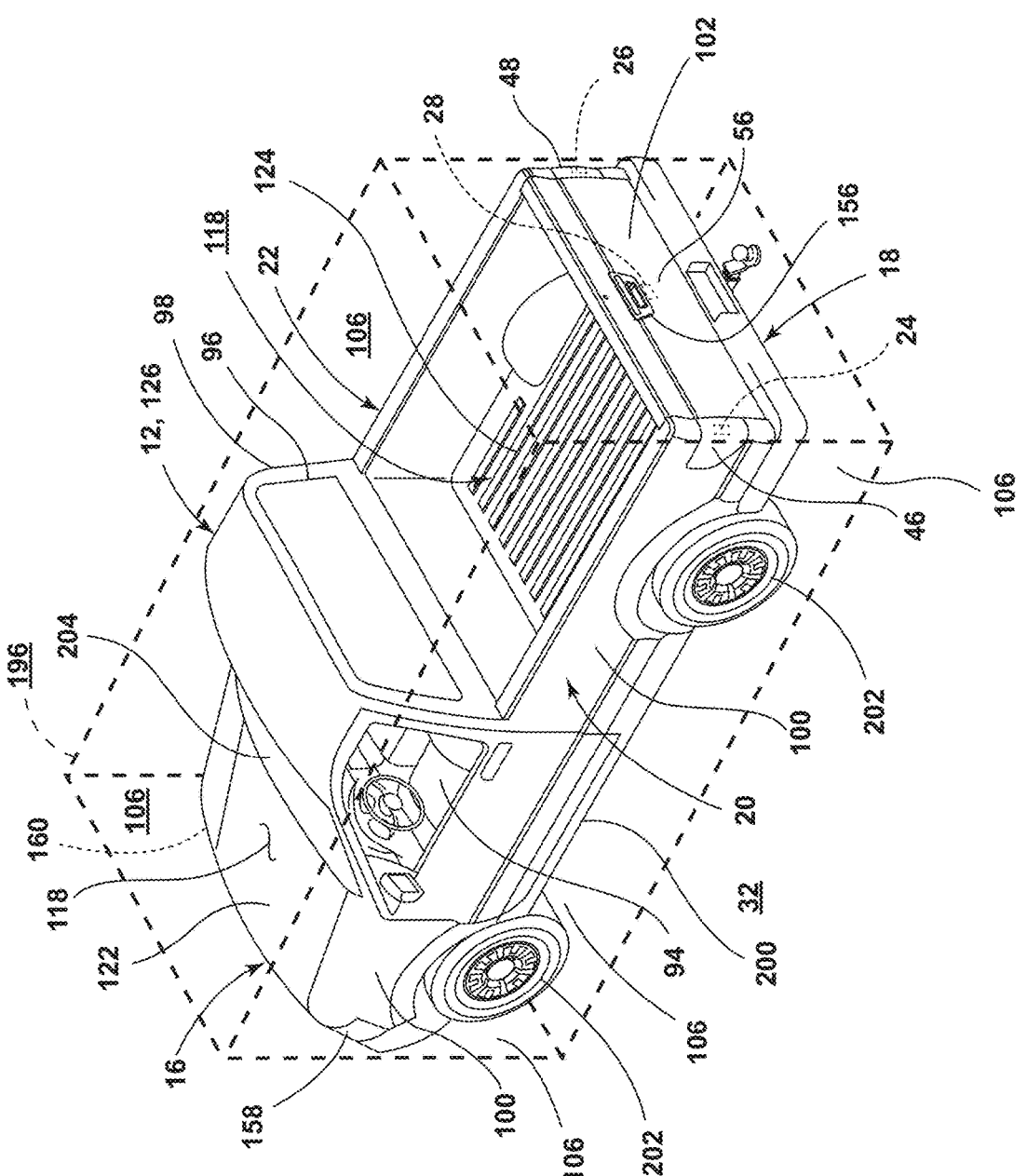
FIG. 7 is a top perspective view of a vehicle within a boundary box defined by control circuitry of a detection system according to one aspect of the present disclosure.

Referring more particularly to FIG. 7, a rectangular boundary box 196 encompassing the vehicle 12 may be defined by the control circuitry 44 of the detection system 10. The boundary box 196 may be a representative of space occupied by the vehicle 12 and free space, or availability, for the obstruction 30 to be disposed in. For example, void 106 above the bed 124 of the truck 126 or above the hood 122 of the front 16 compartment of the truck 126 may be available for obstructions 30. Accordingly, and consistent with previous examples of enhancing availability of space for the vehicle 12, the detection system 10 may allow for enhanced ease-of-use and maneuverability for the vehicle 12 during a reversing operation or parking operation.

Still referring to FIG. 7, the upper wall 98 of the passenger compartment 94 may extend along an upper plane. For example, the upper plane may extend vertically. The end 102 of the vehicle 12, which may be the rear 18 or the front 16 of the vehicle 12, may also extend in a plane, such as an end plane that also extends vertically and parallel to the upper plane. The sides of the vehicle 12 may also generally or substantially extend in a vertical plane. Thus, voids 106 may be formed within the boundary box 196 in which the obstruction may be disposed. For example, the control circuitry 44 may define the void 106 above the extension 100 (e.g., the bed 124 of the truck 126) between the upper plane and the end plane. For example, available space may be above the bed 124 of the truck 126 and/or above the hood 122 of the truck 126 between a front of the passenger compartment 94 of the vehicle 12. Other voids 106 may be below a chassis 200 of the vehicle 12 to allow for obstructions 30 to be disposed below the chassis 200 without interfering with maneuvering of the vehicle 12. For example, bumps or uneven terrain may be scanned by the RADAR modules 24, 26, 28 and determined, by the control circuitry 44, to be disposed in the available space under the vehicle 12. Thus, the arrangement 178 of the RADAR modules 24, 26, 28 in the tailgate 56 and the taillights may allow for enhanced maneuvering of the vehicle 12 on uneven terrain and/or about obstacles at a height of the passenger compartment 94.

Still referring to FIG. 7, the boundary box 196 may generally be bounded by vertical planes extending along the front 16, the rear 18, and the sides of the vehicle 12, as well as horizontal planes extending at a topmost point of the vehicle 12 and a bottommost point of the vehicle 12 (e.g., contact of the tires 202 of the vehicle 12 with the driving surface 144). Thus, the voids 106 described herein may be any crevice or void accessible from outside of the boundary box 196 by the obstructions 30 which may protrude into the voids 106.

Figure 8:
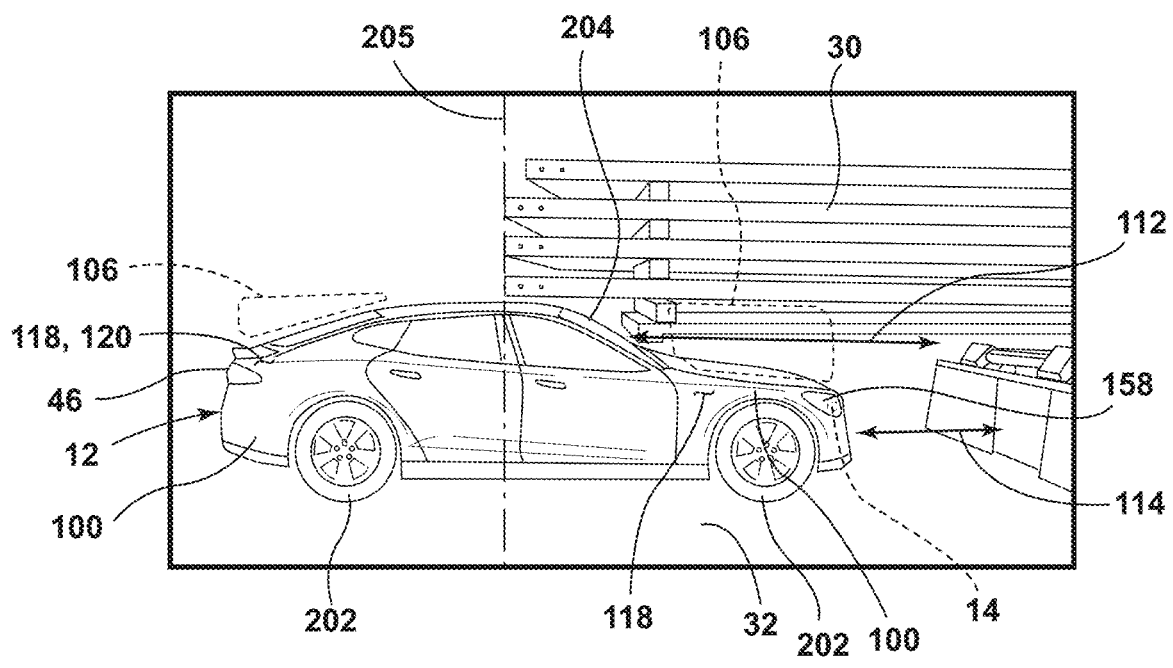
FIGS. 8 and 9 are side perspective views of obstructions within available space above an extension of a vehicle.

Referring now to FIGS. 8-11, exemplary utilization of the voids 106 are generally demonstrated. With reference to FIG. 8 in particular, a parallel parking operation may be enhanced by allowing the vehicle 12 (e.g., a car) to be parked behind an obstruction 30 that may protrude into of the voids 106 above the hood 122 of a front compartment of the vehicle 12. In this example, the three RADAR modules 24, 26, 28 may be incorporated into the two headlights 158, 160 and a central location between the two headlights 158, 160. As shown, the first potential contact point 72 between the obstruction 30 and the end 102 may be determined by the control circuitry 44, and the second potential contact point 74 between the obstruction 30 and the upper plane may be determined by the control circuitry 44. In this example, the upper plane may extend at an oblique angle with a windshield 204 of the vehicle 12 to form an oblong-shaped voids 106. The control circuitry 44 may compare the first and second potential contact points 72, 74 to calculate the available position for the obstruction 30. As depicted, the first contact distance 112 between the first potential contact point 72 and the end 102 (e.g., the front 16), may be calculated and compared to the second contact distance 114 between the second potential contact point 74 and the upper wall 98. Depending on the magnitude of the first and second contact distances 112, 114, the maximum travel for the vehicle 12 in the motion direction (e.g., vehicle-forward) may be assigned by the control circuitry 44. For example, the shorter of the first contact distance 112 and the second contact distance 114 may be assigned to the maximum travel for the vehicle 12 to limit contact with the obstruction 30. It is contemplated that the first and second contact distances 112, 114 may be aligned with the motion direction. For example, as will be described in reference to FIG. 9, the motion direction may be vehicle-rearward.

In some examples, the voids 106 may be excluded for utilization by the control circuitry 44. For example, if a void 106 above the front compartment of the vehicle 12 is mapped by the control circuitry 44 using RADAR, the control circuitry 44 may determine that this void 106 is not free for receiving the external obstruction 30. Thus, height detection by the present time-of-flight devices 14 may limit contact with the obstruction 30 by detecting the forward-most point of the vehicle 12 and the rearward-most point of the obstruction 30 (or vice versa). The control circuitry 44 may then compare these points and determine an available position for the vehicle 12 based on the two points not crossing a common vertical plane 205. In other words, the void 106 may not be utilized for the obstruction 30, but rather be free space from the obstruction 30. Thus, in the example illustrated in FIG. 8, the control circuitry 44 may limit the vehicle 12 from automatic or manual maneuvering into the position illustrated and instead allow the vehicle 12 to move behind the vertical plane 205.

Figure 9:
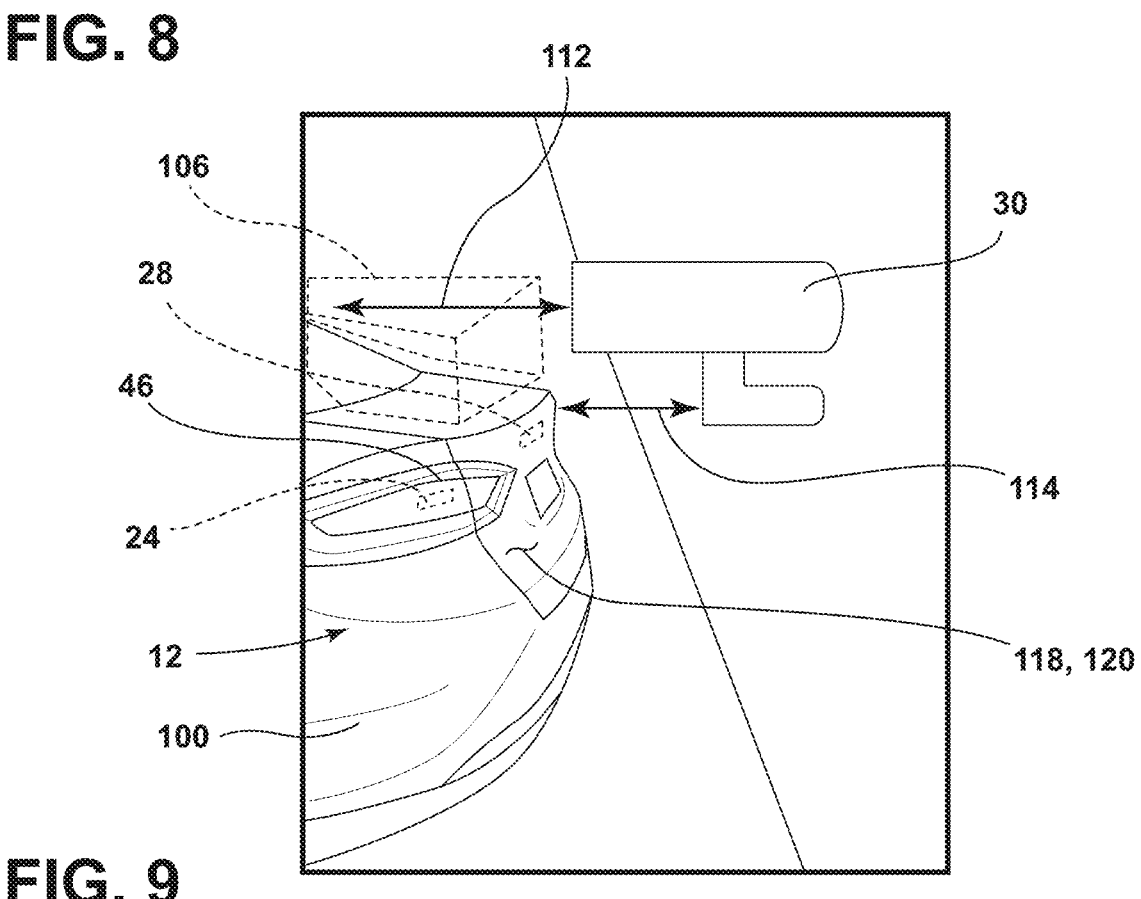

With reference particularly to FIG. 9, the obstruction 30 may be above the rear 18 of the vehicle 12, and the controller 162 may define the available space above the rear 18 of the vehicle 12. In this example, multiple contact points may be determined by the control circuitry 44 due to the obstruction 30 having an irregular shape to allow a part of the obstruction 30 is disposed within the available space while another part of the obstruction 30 to the outside of the boundary box 196. In this example, the first contact distance 112 is greater than the second contact distance 114. Accordingly, the control circuitry 44 may communicate an instruction to stop reversing of the vehicle 12 as the second contact distance 114 approaches zero. Accordingly, the available position for the vehicle 12 may have at least a portion of the obstruction 30 disposed in the available space above the compartment.

Figures 10, 11:
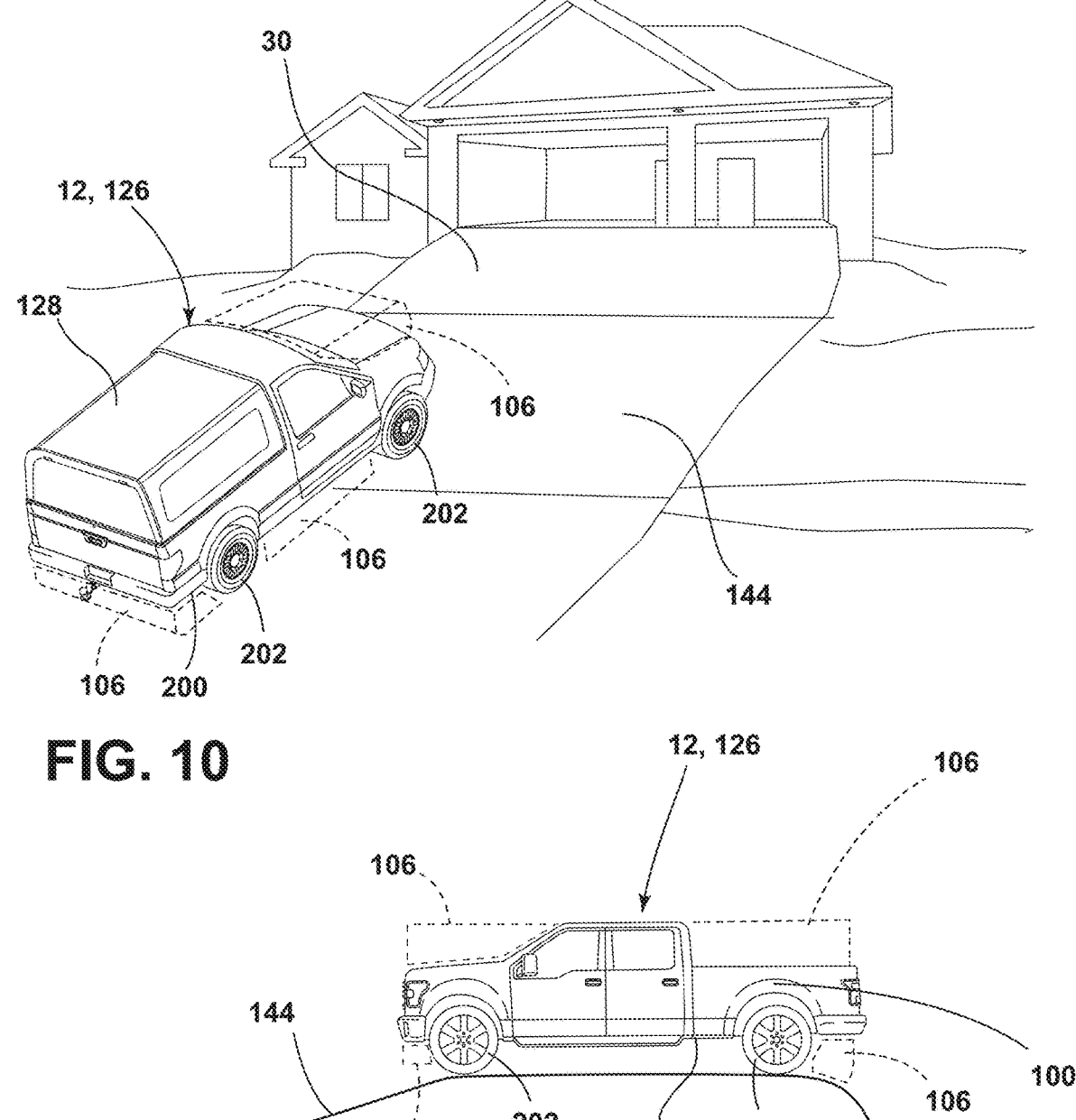
FIG. 10 is a perspective view of a vehicle incorporating a detection system configured to detect an inclining topography of a driveway.
FIG. 11 is a side view of a vehicle incorporating a detection system configured to detect a declining topography of land.
Figure 12:
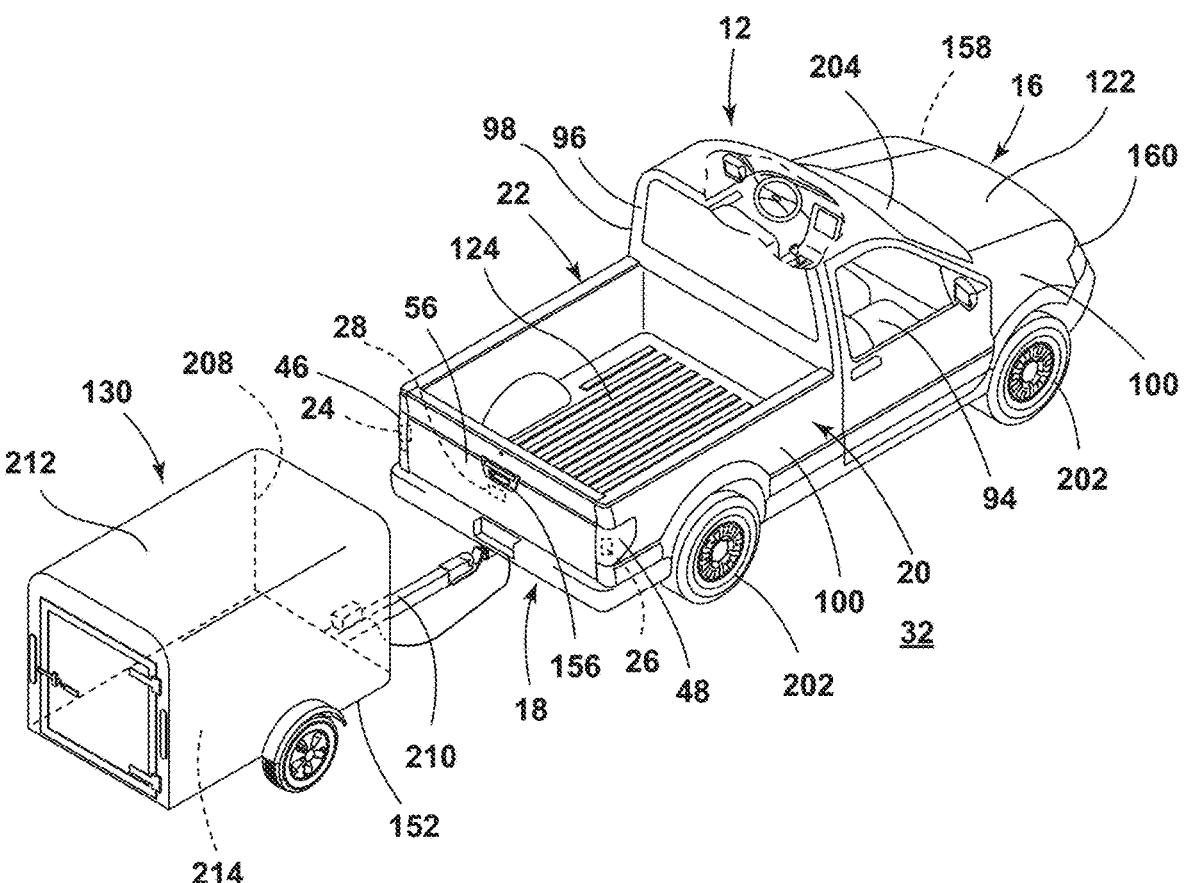
FIG. 12 is a perspective view of a towable device operably coupled with a vehicle incorporating a detection system configured to detect stability conditions of the towable device.
Figure 13:
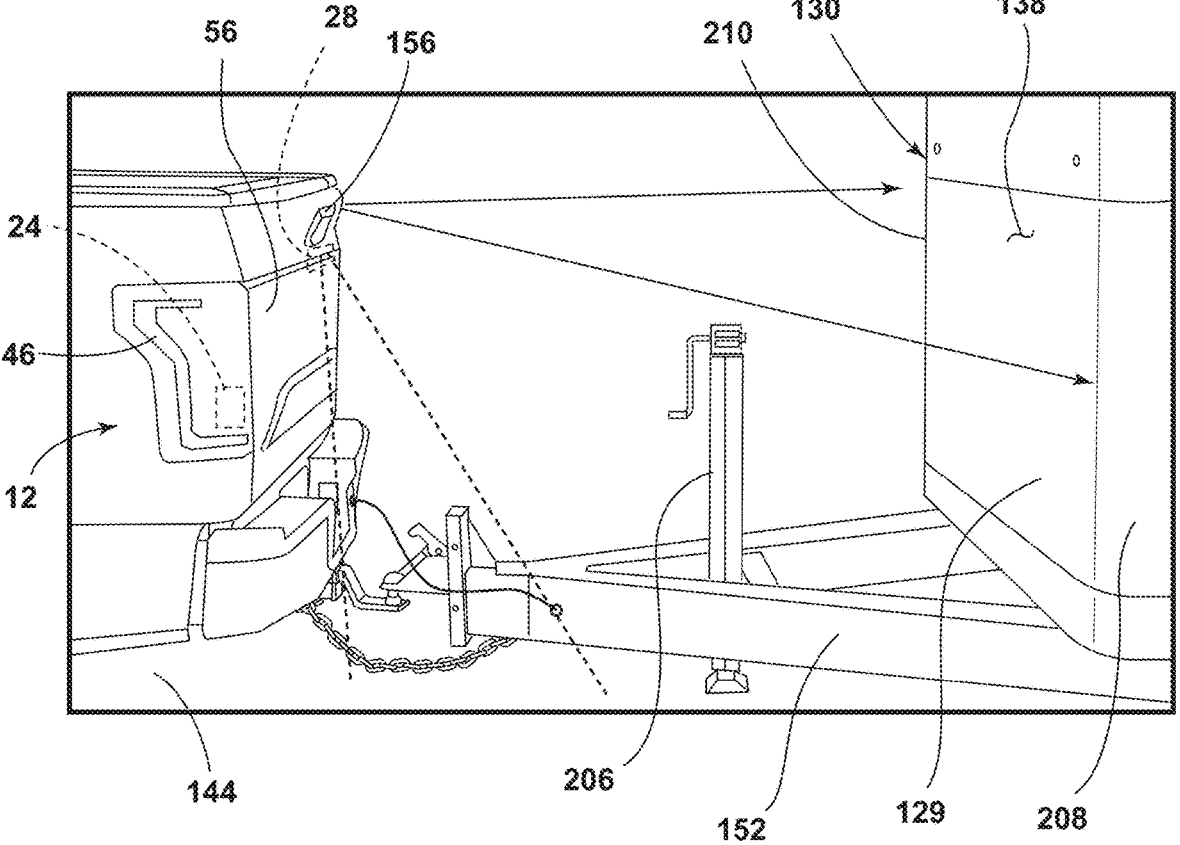
FIG. 13 is a detailed perspective view of a hitch connection between a vehicle and a towable device and demonstrating fields of view of a detection system according to one aspect of the present disclosure.

Referring now to FIGS. 10 and 11, variations in terrain or the topography of the driving surface 144 may present obstructions 30 for available spaces underneath the chassis 200 of the vehicle 12. For example, by utilizing the plurality of RADAR modules 24, 26, 28 in the rear 18 or in the front 16 of the vehicle 12, obstructions 30 presented by the driving surface 144 may be detected and allow the detection system 10 to limit contact of the vehicle 12 with these obstructions 30. For example, curbs along a curved pathway (e.g., a driveway) may be detected by the RADAR modules 24, 26, 28 despite extending alongside the vehicle 12. In addition, weather conditions, such as snow and ice accumulation may be detected by using the first, second, and third RADAR modules 24, 26, 28 around the region exterior 32 to the vehicle 12. Based on the positional information captured by the RADAR modules 24, 26, 28, the control circuitry 44 may communicate instructions to adjust the steering, braking, speed, or other operational parameters of the vehicle 12 to slow or stop movement of the vehicle 12. In the example illustrated in FIG. 10, the control circuitry 44 may determine that the driveway is too steep and communicate an instruction to adjust the brakes of the vehicle 12 to limit movement of the vehicle 12 up the driveway. Similarly, and with reference to FIG. 11, variations in elevation, such as a sharp decline, may be detected by the control circuitry 44 based on the positional information. Further, the fields of view 34, 36, 42 of the RADAR modules 24, 26, 28 may reveal the sharp change in elevation behind the vehicle 12. The control circuitry 44 may therefore communicate instructions to engage the brakes at the brake system 92 or adjust steering or speed of the vehicle 12, via communication with the powertrain. In this way, the detection system 10 may limit contact with obstructions 30 (e.g., a sloped driveway) or poignant or unexpected terrain shifts. In the previous examples demonstrated in FIGS. 8 and 9, parking maneuvering may be enhanced by the detection system 10 by indicating to the user or automatically adjusting movement of the vehicle 12 to account for the available spaces within the boundary box 196.

With continued reference to FIGS. 10 and 11, the vehicle 12 may be the truck 126 that may selectively incorporate a cover 128 to cover the bed 124 of the truck 126. As previously described, a sensor may detect the presence or absence of the cover 128 to allow the control circuitry 44 to define or limit the available space above the bed 124 of the truck 126. Accordingly, the present detection system 10 may account for modifications and vehicle structure to dynamically enhance the voids 106 about the vehicle 12 and perform accurate estimations for space availability.

Referring now to FIGS. 12-16C, the detection system 10 may provide for enhanced monitoring and stability detection for the towable device 130 (e.g., trailer, another vehicle, recreational vehicle, dune buggy, camper) by employing the present time-of-flight devices 14 to monitor structures of the towable device 130 and the vehicle-to-device connection. For example, the third RADAR module 28 may be configured to gather positional data about a hitch ball of the vehicle 12 and a hitch of the towable device 130. Other features of the vehicle-to-device connection may include a sway bar, the frame 152 of the towable device 130, a support leg 206 for the towable device 130, or other structural features at the vehicle-to-device connection. Based on this positional information, the control circuitry 44 may communicate instructions to the powertrain 54 and/or the brake system 92 to adjust movement of the vehicle 12. In addition, or in an alternative, the control circuitry 44 may communicate instructions to the HMI 177 to present indications of a yaw angle of the towable device 130 relative to the vehicle 12, a position of the towable device 130 relative to the vehicle 12, or other information related to the stability of the towable device 130, as will be described further herein. It is contemplated that, although illustrated as a trailer, the towable device 130 may be any apparatus configured to couple, or hitch, to the vehicle 12 to allow the vehicle 12 to tow the towable device 130.

In some examples, the positional information gathered by the RADAR modules 24, 26, 28 may include three-dimensional positional information of the frame 152 of the towable device 130 relative to the hitch ball and/or the tailgate 56 of the vehicle 12. Accordingly, the yaw angle may be determined based on triangulation of the data captured from at least a pair of the plurality of RADAR modules 24, 26, 28. Further, the positional information gathered by the RADAR modules 24, 26, 28 may be incorporated with the control circuitry 44 in combination with video data captured by a camera directed toward the vehicle-to-device connection to provide enhanced machine learning and/or artificial intelligence features for detecting the yaw angle and/or a rate of change of the yaw angle. Accordingly, by synthesizing video feedback with positional information from RADAR, various guides, such as stickers, or other markings applied to the vehicle-to-device connection may be omitted.

In general, the detection system 10 may be employed to estimate a width of the towable device 130, the length of the towable device 130, the pitch of the towable device 130, and any other geometric feature within the fields of view 34, 36, 42 of the RADAR modules 24, 26, 28. The detection system 10 may further provide for redundancy by employing the first and third RADAR modules 24, 28 to map a left side of the towable device 130 and the second and third RADAR modules 26, 28 to map a right side of the trailer 130. Accordingly, side edges 208, 210 of the front wall 138 of the towable device 130 may be detected by the RADAR modules 24, 26, 28 and the angle of the side edges 208, 210 may be determined by the control circuitry 44 to determine the pitch of the towable device 130. For example, three-dimensional positional information of the front wall 138 of the towable device 130 at various heights behind the vehicle 12 may be captured by operating the third RADAR module 28 along both the first and second angular ranges 182, 184 previously described with respect to FIG. 6C. By gathering positional information of the front wall 138 of the trailer 130 at various heights, the pitch of the trailer 130 may be defined by the control circuitry 44. For example, if the side edges 208, 210 taper away from a vertical plane toward a top end 212 of the trailer 130 and are nearer to the vertical plane or nearer to the RADAR modules 24, 26, 28 at a bottom end 214 of the trailer 130, the control circuitry 44 may determine that the trailer 130 is angled downwardly relative to the vehicle 12. For example, the trailer 130 may be lifted from a front end of the trailer 130 to dump contents of the trailer 130 out of a back end of the trailer 130 or the trailer 130 may be on a decline relative to the driving surface 144 of the vehicle 12.

Figure 14:
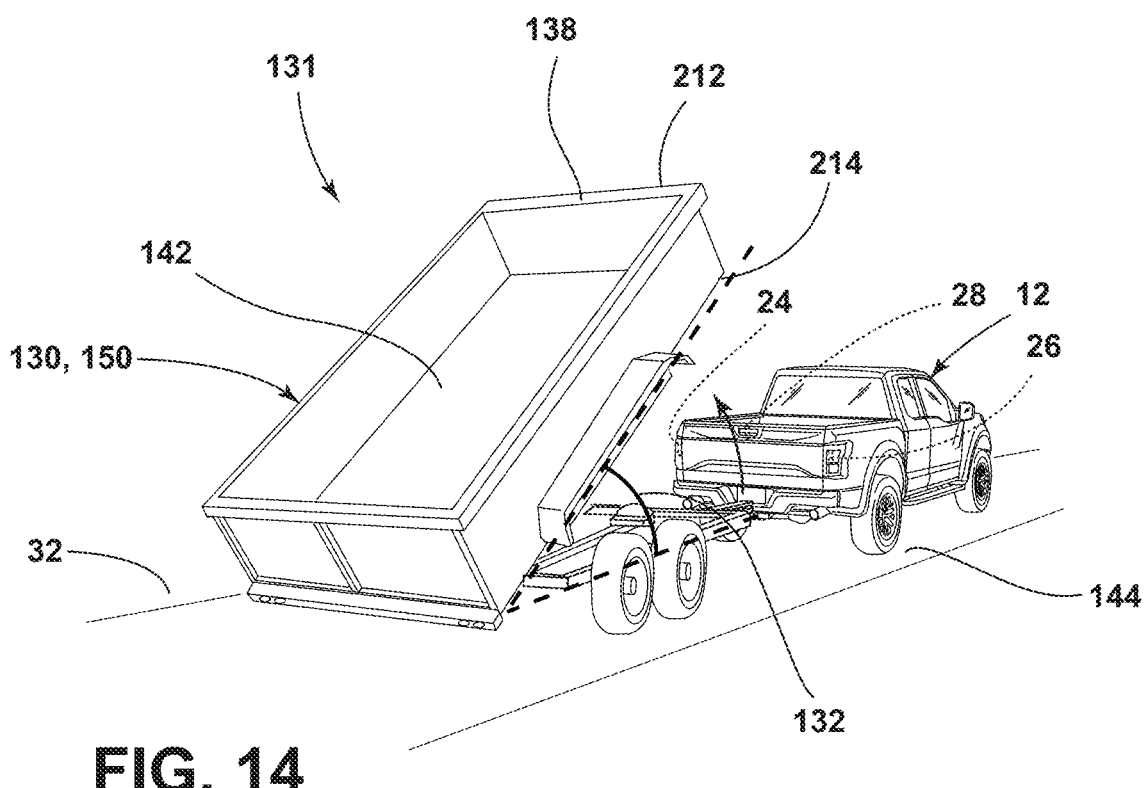
FIG. 14 is a rear perspective view of a dump trailer tilted upwardly at a pitch angle.
Figure 15:
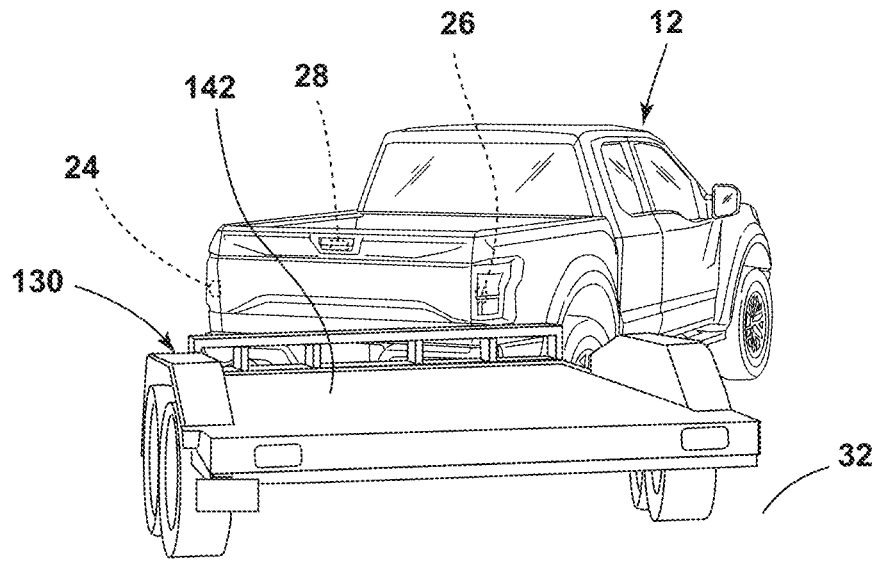
FIG. 15 is a rear perspective view of a towable device operably coupled with a vehicle that incorporates a detection system configured to detect a length of the towable device.

Referring now more particularly to FIGS. 14 and 15, the RADAR modules 24, 26, 28 may be configured to map the contour of the floor 142 and/or the front wall 138 of the trailer 130 to determine the tilt 131 or pitch of the trailer 130. For example, when the trailer 130 is a dump trailer 150 and the lift unit 153 drives the trailer 130 to an unloading position, the floor 142 of the trailer 130 may extend at an oblique angle relative to the driving surface 144. Accordingly, the trailer 130 may be pitched upwardly at an oblique angle. As demonstrated in FIG. 14, the tilt 131 of the floor 142, which may be the contour, may in some examples, extend at an angular range of between zero and 180°. The threshold angle 132 may be between zero and 180°. In some examples, the threshold angle 132 is between 30° and 90°. In other examples, the threshold angle 132 is less than or more than 90°. In general, the threshold angle 132 may be determined by the system based on the length of the trailer 130, the height of the trailer 130 (e.g., as determined based on the positional information), or other geometric parameters of the trailer 130 which may be manually entered at the user interface or may be detected by the control circuitry 44. For example, if the height and the length of the trailer 130 are determined to be approximately equal, the threshold angle 132 may be less than if the length of the trailer 130 is greater than the height of the trailer 130. Further, as previously described, the weight of the trailer 130, including the contents of the trailer 130, may be factored into determination of the controller 162 of the threshold angle 132.

Still referring to FIGS. 14 and 15, when the trailer 130 exceeds the threshold angle 132, the controller 162 may determine an unstable condition or a max travel of the trailer 130 to limit tipping backward of the towable device 130, a pulling force of the vehicle 12 backward, or another unstable condition. In response, the control circuitry 44 may communicate an instruction to interrupt the lift unit driving the towable device 130 upwardly.

Figure 16A:
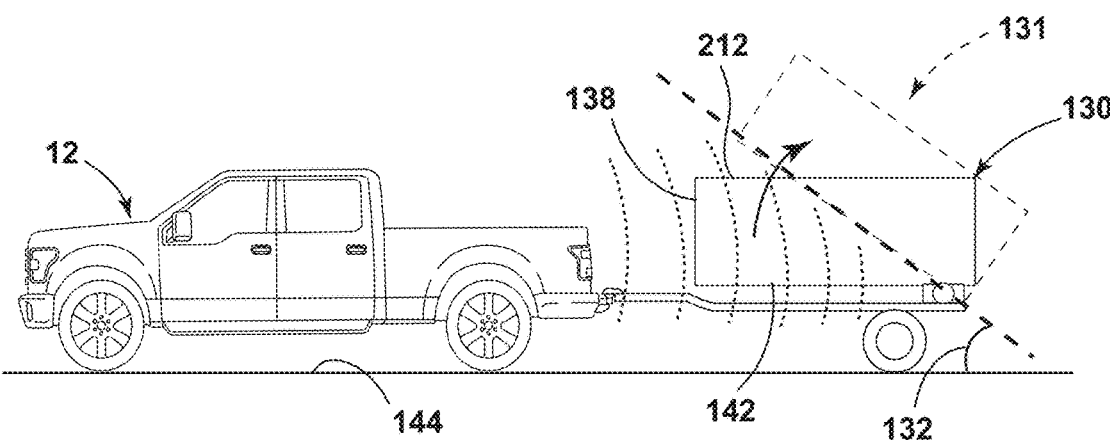
FIGS. 16A-16C are side views of a towable device operably coupled with the vehicle and demonstrating a plurality of tilt angles of the towable device relative to a tailgate of the vehicle.
Figure 16B:
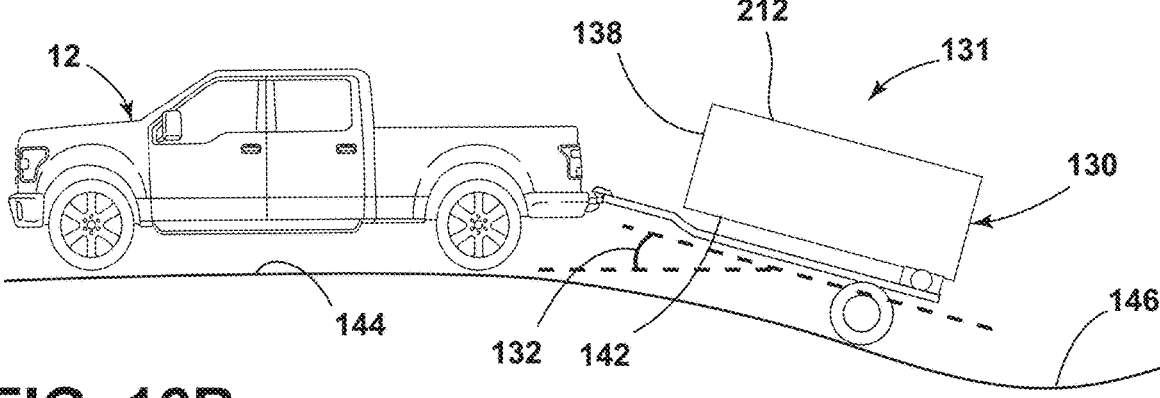
Figure 16C:
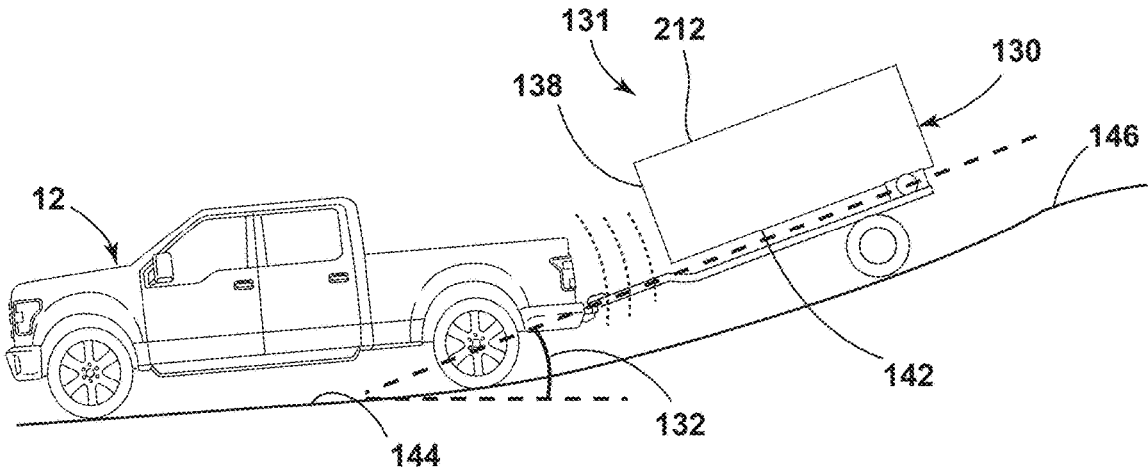

Referring now to FIGS. 16A-16C, various examples of unstable conditions are presented. With reference to FIG. 16A particularly, the unstable condition corresponds to the trailer 130 exceeding the threshold angle 132 calculated by the control circuitry 44 or manually entered by the user at the user interface. In this example, an unloading operation of the trailer 130 may be interrupted by the controller 162 stopping, or communicating an instruction to stop, actuation of a motor 176 or other part of the lift unit 153 driving lifting of the trailer 130. In this example, the RADAR modules 24, 26, 28 may gather positional information of the floor 142 of the trailer 130 to determine the tilt 131 of the trailer 130.

Referring particularly to FIGS. 16B and 16C, the tilt 131 of the trailer 130 may be determined based on the contour of the front wall 138 of the trailer 130. In these examples, the driving surface 144 is declined (FIG. 16B) or inclined (FIG. 16C) resulting in unstable conditions for the trailer 130 relative to the vehicle 12. For example, in these examples, the control circuitry 44 may estimate the floor 142 of the trailer 130 to be generally orthogonal relative to the front wall 138, and therefore calculate the pitch of the trailer 130 based on the projected orientation/position of the floor 142. Thus, due to the distance of measurement provided by the RADAR modules 24, 26, 28 of the present disclosure, the tilt 131 or pitch of the trailer 130 may be detected in various unstable conditions.

As previously described, it is contemplated that the control circuitry 44 may fix or calculate the threshold angle 132 for the trailer 130 based on the dimensions of the trailer 130 (e.g., the height, length, width, etc.). Further, weight information from the weight sensor 154 may be factored into calculation of the threshold angle 132. Accordingly, the present detection system 10 may be provided for enhanced stability control and maneuvering of the vehicle 12. Further, by providing communication with the mobile device 170 of the user at the rear 18 of the vehicle 12, the user may be located relative to the three RADAR modules 24, 26, 28 and allow for limited obstructions 30 along the movement direction.

The present detection system 10 may have other enhancements relative to imagers or camera systems for monitoring the region exterior 32 to the vehicle 12 and behind the vehicle 12. For example, environmental challenges, such as mud, snow, ice, fogging of lenses, or any other weather-related challenge may be limited from influencing the positional information captured by the RADAR modules 24, 26, 28. Accordingly, the detection system 10 may allow for reduced or omitted ultrasonic sensing typically incorporated for autonomous control and detection of objects 50, 78, 80 or obstructions 30 around the vehicle 12 and may limit the need or enhance the use of a camera focused toward the region exterior 32 and behind the vehicle 12.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle, comprising:

a passenger compartment having a side and an upper wall extending from the side in an upper plane;

an extension extending from the side of the passenger compartment to an end that extends in an end plane;

at least one time-of-flight sensor configured to capture positional information about an obstruction outside the vehicle;

a powertrain that moves the vehicle in a motion direction; and control circuitry in communication with the at least one time-of-flight sensor and the powertrain, the control circuitry configured to:

define a space above the extension between the side, the upper plane, and the end plane;

determine a first potential contact point between the obstruction and the end;

determine a second potential contact point between the obstruction and the side;

compare the first and second potential contact points;

calculate, based on the positional information and the comparison of the first and second contact points, an available position for the vehicle having the obstruction in the space; and generate an output in response to the available position.

2. The vehicle of claim 1, wherein the control circuitry is further configured to communicate an instruction to adjust the powertrain in response to the calculation of the available position.

3. The vehicle of claim 2, wherein the instruction to adjust the powertrain is based on the comparison.

4. The vehicle of claim 3, wherein the control circuitry is further configured to:

calculate a first contact distance between the first potential contact point and the end;

calculate a second contact distance between the second potential contact point and the side; and assign a maximum travel for the vehicle in the motion direction to one of the first contact distance and the second contact distance.

5. The vehicle of claim 4, wherein the control circuitry is further configured to assign the maximum travel based on the shorter of the first contact distance and the second contact distance.

6. The vehicle of claim 5, wherein the powertrain includes:

a brake system that adjusts a speed of the vehicle in response to the maximum travel.

7. The vehicle of claim 1, wherein the extension includes an outer compartment of the vehicle.

8. The vehicle of claim 7, wherein the outer compartment is a bed of a truck.

9. The vehicle of claim 8, further comprising:

a cover selectively disposed in the space for covering the bed of the truck.

10. The vehicle of claim 9, wherein the control circuitry is further configured to determine a presence of the cover.

11. The vehicle of claim 10, further comprising:

an input in communication with the control circuitry and configured to detect the cover.

12. The vehicle of claim 1, further comprising:

a steering system that adjusts a steering angle of the vehicle to align the vehicle with the available position.

13. The vehicle of claim 1, wherein the space is defined above a trunk or a hood of the vehicle.

14. A vehicle, comprising:

a passenger compartment having a side and an upper wall extending from the side in an upper plane;

an extension extending from the side of the passenger compartment to an end that extends in an end plane;

at least one time-of-flight sensor configured to capture positional information about an obstruction outside the vehicle;

a powertrain that moves the vehicle in a motion direction; and control circuitry in communication with the at least one time-of-flight sensor and the powertrain, the control circuitry configured to:

define a space above the extension between the side, the upper plane, and the end plane;

determine a first potential contact point between the obstruction and the end;

determine a second potential contact point between the obstruction and the side;

compare the first and second potential contact points;

calculate, based on the positional information and the comparison of the first and second contact points, an available position for the vehicle having the obstruction in the space; and communicate an instruction to adjust the powertrain in response to the calculation of the available position.

15. The vehicle of claim 14, wherein the instruction to adjust the powertrain is based on the comparison.

16. The vehicle of claim 15, wherein the control circuitry is further configured to:

calculate a first contact distance between the first potential contact point and the end;

calculate a second contact distance between the second potential contact point and the side; and assign a maximum travel for the vehicle in the motion direction to one of the first contact distance and the second contact distance.

17. The vehicle of claim 16, wherein the control circuitry is further configured to assign the maximum travel based on the shorter of the first contact distance and the second contact distance.

18. The vehicle of claim 17, wherein the powertrain includes:

a brake system that adjusts a speed of the vehicle in response to the maximum travel.

19. The vehicle of claim 14, wherein the control circuitry is further configured to determine that the space is a void above a front compartment of the vehicle, and configured to compare a rearward-most point of the obstruction and a forward-most point of the vehicle to calculate the available position.

20. A vehicle, comprising:

a passenger compartment having a side and an upper wall extending from the side in an upper plane;

an outer compartment extending from the side of the passenger compartment to an end that extends in an end plane;

at least one time-of-flight sensor configured to capture positional information about an obstruction outside the vehicle;

a powertrain that moves the vehicle in a motion direction; and control circuitry in communication with the at least one time-of-flight sensor and the powertrain, the control circuitry configured to:

define a space above the extension between the side, the upper plane, and the end plane;

calculate, based on the positional information, an available position for the vehicle having the obstruction in the space;

determine a first potential contact point between the obstruction and the end;

determine a second potential contact point between the obstruction and the side;

compare the first and second potential contact points to calculate the available position;

calculate a first contact distance between the first potential contact point and the end;

calculate a second contact distance between the second potential contact point and the side;

assign a maximum travel for the vehicle in the motion direction to one of the first contact distance and the second contact distance; and communicate an instruction to adjust the powertrain in based on the comparison.

* * * * *